(12) United States Patent
Brown

(10) Patent No.: US 8,142,083 B2
(45) Date of Patent: *Mar. 27, 2012

(54) EXTENDABLE CAMERA SUPPORT AND STABILIZATION APPARATUS

(76) Inventor: Garrett W. Brown, Philadelphia, PA (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/779,672

(22) Filed: May 13, 2010

(65) Prior Publication Data

US 2010/0278523 A1  Nov. 4, 2010

Related U.S. Application Data

(63) Continuation-in-part of application No. 12/618,057, filed on Nov. 13, 2009, now Pat. No. 7,931,412.

(60) Provisional application No. 61/114,709, filed on Nov. 14, 2008, provisional application No. 61/119,921, filed on Dec. 4, 2008, provisional application No. 61/315,648, filed on Mar. 19, 2010, provisional application No. 61/322,096, filed on Apr. 8, 2010.

(51) Int. Cl.
*G03B 17/00* (2006.01)

(52) U.S. Cl. ............................ 396/421; 352/243
(58) Field of Classification Search .................. 396/421; 352/243

See application file for complete search history.

(56) References Cited

U.S. PATENT DOCUMENTS

| 765,980 A | 7/1904 | Mercier |
| 2,156,862 A | 5/1939 | Maugard |
| 2,945,428 A * | 7/1960 | Dearborn .................. 396/421 |
| 3,756,549 A | 9/1973 | Lange |
| 3,914,540 A | 10/1975 | Slater |
| 3,919,902 A | 11/1975 | Johnson |
| 4,017,168 A | 4/1977 | Brown |
| 4,092,673 A | 5/1978 | Adams |
| 4,155,100 A | 5/1979 | Hill, Jr. |
| 4,156,512 A * | 5/1979 | Brown .......................... 248/586 |
| 4,158,490 A * | 6/1979 | Gottschalk et al. ........... 352/243 |
| 4,206,983 A * | 6/1980 | Nettman et al. ............... 352/243 |
| 4,208,028 A | 6/1980 | Brown et al. |
| 4,233,634 A | 11/1980 | Adams |
| 4,270,387 A | 6/1981 | Hoffman |

(Continued)

FOREIGN PATENT DOCUMENTS

FR   2722893 A1   1/1996

(Continued)

OTHER PUBLICATIONS

Clanton, S Proceeding Paper, A Novel Machine Interface for Scaled Telesurgery, Medical Imaging 2004: Visualization, Image-Guided Procedures and display 5367, 2004, 697-704 (Abstract).

(Continued)

*Primary Examiner* — Clayton E LaBalle
*Assistant Examiner* — Warren Fenwick
(74) *Attorney, Agent, or Firm* — Schnader Harrison Segal & Lewis, LLP

(57) ABSTRACT

A support system used to orient and utilize equipment remotely positioned from an operator and supported in a stabilized manner. The support system includes a balance pole with a master end and a slave end attached to a master sled and slave sled, respectively. The system includes a mechanism to replicate the motion at the master sled at the slave sled. A gimbal and handle assembly with a motion dampening capabilities is also included.

49 Claims, 32 Drawing Sheets

U.S. PATENT DOCUMENTS

| | | | |
|---|---|---|---|
| 4,306,714 A | 12/1981 | Loomis | |
| 4,394,075 A | 7/1983 | Brown et al. | |
| 4,474,439 A | 10/1984 | Brown | |
| RE32,213 E * | 7/1986 | Brown | 352/243 |
| 4,625,938 A | 12/1986 | Brown | |
| 4,657,267 A | 4/1987 | Jaumann et al. | |
| 4,672,436 A | 6/1987 | Hawthorne | |
| 4,710,819 A | 12/1987 | Brown | |
| 4,849,778 A | 7/1989 | Samuelson | |
| 4,946,272 A | 8/1990 | Brown | |
| 4,976,387 A * | 12/1990 | Spianti | 224/262 |
| 4,989,466 A | 2/1991 | Goodman | |
| 5,065,249 A | 11/1991 | Horn et al. | |
| 5,098,182 A | 3/1992 | Brown | |
| 5,229,798 A | 7/1993 | Brown | |
| 5,243,370 A | 9/1993 | Slater | |
| 5,360,196 A | 11/1994 | DiGiulio et al. | |
| 5,389,987 A | 2/1995 | Corbeil | |
| D358,832 S | 5/1995 | Lenny et al. | |
| 5,435,515 A | 7/1995 | Digiulio | |
| 5,490,655 A | 2/1996 | Bates | |
| 5,579,071 A | 11/1996 | Wetzel et al. | |
| 5,650,821 A * | 7/1997 | Hewlett | 348/373 |
| 5,742,859 A * | 4/1998 | Acker | 396/419 |
| 5,752,112 A | 5/1998 | Paddock | |
| 5,786,854 A | 7/1998 | Slade et al. | |
| 5,797,054 A * | 8/1998 | Paddock et al. | 396/421 |
| 5,850,579 A | 12/1998 | Melby et al. | |
| 5,856,862 A | 1/1999 | Kokush | |
| 5,908,181 A | 6/1999 | Valles-Navarro | |
| 5,940,644 A | 8/1999 | Putora | |
| 5,963,749 A * | 10/1999 | Nicholson | 396/421 |
| 6,293,676 B1 * | 9/2001 | Holway | 352/243 |
| 6,377,011 B1 | 4/2002 | Ben Ur | |
| 6,530,702 B2 | 3/2003 | Harris | |
| 6,578,967 B1 | 6/2003 | Paddock | |
| 6,685,148 B2 | 2/2004 | Zadok | |
| 6,701,081 B1 | 3/2004 | Dwyer et al. | |
| 6,752,541 B1 | 6/2004 | Dykyj | |
| 6,776,488 B2 | 8/2004 | Burbulla | |
| 6,808,324 B2 * | 10/2004 | McKay | 396/421 |
| 6,858,003 B2 | 2/2005 | Evans | |
| 6,999,852 B2 | 2/2006 | Green | |
| 7,000,883 B2 | 2/2006 | Mercadal | |
| 7,055,368 B2 | 6/2006 | Schneider | |
| 7,065,888 B2 | 6/2006 | Jaklitsch et al. | |
| 7,128,419 B2 | 10/2006 | Harris | |
| 7,192,203 B2 | 3/2007 | Schaller | |
| 7,371,028 B2 | 5/2008 | Gordon | |
| 7,390,131 B2 | 6/2008 | Schaller | |
| 7,480,041 B2 | 1/2009 | Lindner | |
| 7,618,016 B2 | 11/2009 | Brown | |
| 7,625,090 B2 | 12/2009 | Brown et al. | |
| 7,931,412 B2 * | 4/2011 | Brown | 396/421 |
| 2005/0043718 A1 | 2/2005 | Madhani et al. | |
| 2006/0262274 A1 | 11/2006 | Brown et al. | |
| 2007/0050139 A1 | 3/2007 | Sidman | |
| 2007/0080275 A1 | 4/2007 | Stachowski et al. | |
| 2008/0046122 A1 | 2/2008 | Manzo | |
| 2008/0122958 A1 | 5/2008 | Huseth et al. | |
| 2008/0187308 A1 | 8/2008 | Hannan | |
| 2010/0065705 A1 | 3/2010 | Brown et al. | |
| 2010/0095483 A1 | 4/2010 | Brown | |
| 2010/0124414 A1 | 5/2010 | Brown | |

FOREIGN PATENT DOCUMENTS

| | | |
|---|---|---|
| JP | 57023247 A | 2/1982 |
| WO | 1996015404 A1 | 5/1996 |
| WO | 2009033308 A1 | 3/2009 |

OTHER PUBLICATIONS

International Search Report and Written Opinion dated Apr. 13, 2010 for PCT Patent Application No. PCT/US2009/064351.
International Search Report and Written Opinion dated Jul. 15, 2010 for PCT Patent Application No. PCT/US2010/034764.

* cited by examiner

EXTENDABLE CAMERA SUPPORT AND STABILIZATION APPARATUS

The invention relates to stabilizers for cameras and other similar devices. Particular, embodiments of the invention relate to extendable camera stabilization devices that are typically body-mounted, and are designed to produce smooth moving shots over all types of terrain.

BACKGROUND OF THE INVENTION

Body mounted camera stabilization devices are typically comprised of a camera equipment support system with a three-axis gimbal at its center of gravity. The support structure is usually attached to an articulated support arm that is in turn attached to an operator-worn vest, although the arm may be mounted to other stationary or mobile structures. These devices are designed to support and isolate a camera or other device from the unwanted movements of a walking, running or otherwise moving operator, vehicle or operator/vehicle combination. Common examples of such devices are those marketed under the trademark Steadicam®.

The body-mounted stabilizer camera support structure, conventionally known as the 'sled', generally includes extended masses to enhance inertial stability and to position the center of balance in an accessible location. The camera support 'sled' structure is approximately neutrally counterbalanced by a rigidly mounted camera at one end of a centerpost, and other rigidly mounted components, (video monitor, battery, focus equipment, microwave transmission equipment, camera control unit equipment, other electronics, etc) at the other end of the post. The camera can thus be aimed in any direction by slight hand pressure adjacent to the gimbal. The mutually perpendicular directions of these aiming motions are distinctly referred to as pan, tilt and roll.

As used herein, unless otherwise specified, "roll" denotes rotation about an axis generally parallel to the camera's lens, "pan" describes rotation about an axis that runs down the center of the camera-support central post, and which is offset 90° from the roll axis 'Tilt' describes rotation about a substantially horizontal axis perpendicular to both the lens axis and the pan axis.

Since the camera and monitor are rigidly attached to the support structure, vertical camera travel, while maintaining a level camera horizon, is restricted to the maximum vertical excursion of the articulated support arm, which is typically 32 inches in standard mode plus an overlapping, but discontinuous, 32 inches in 'low mode'. Conversion to low mode requires mechanically removing the camera, inverting the support structure, and reattaching it to the inverted support structure via a so-called 'low-mode bracket' that is different for every camera. Additionally, the monitor must be inverted, the gimbal adjusted along the center-post to restore the desired slight bottom-heaviness of the balanced masses; a special gimbal-to-arm attachment bracket must be employed; and all cables of the entire camera system must be detached and reattached.

Finally, the system must be rebalanced. This time-intensive procedure must be followed every time the conversion from low mode to high, or high mode to low, is required. Often, due to time constraints, the shot is eliminated, much to the chagrin of the director and operator.

Another problem for operators of these devices arises when a low-mode shot requires surmounting some type of obstacle, such as a car hood, fence, bar, desk, etc. due limited lateral reach of the support arm.

Gyro-leveled, 'roll-cage-mounted' camera supports are known, and are marketed, for example, under the trade name "AR", which permit continuous 'low-mode' to 'high-mode' shooting. These devices, however are extremely awkward to operate, since, on the way from low to high positions, 'tilt' and 'pan' progressively require non-intuitive manipulations of the stabilizer's center post which are unrelated to the camera's actual orientation.

Extended pole-supported, remotely controlled camera mounts, including one marketed as 'Pole-Cam, are known in the art and simply constructed, but they are extremely unstable unless mounted on stationary tripod supports.

A need therefore exists for an apparatus for augmenting the capabilities of equipment-stabilizing supports—in particular body-mounted camera stabilizers—and extending their reach and angular agility so that stabilized operations, such as shots, can be made that preferably include unrestricted and intuitive angular control of the camera, as well as large lateral and vertical displacements from the operator's position,

SUMMARY OF THE INVENTION

Embodiments of the invention provide a device to orient and utilize equipment remotely positioned from an operator and supported in a stabilized manner. Particular embodiments of the invention are compatible with lightweight cameras, including those less than one pound, or even less than 0.5 pounds.

In an exemplary embodiment of the invention, one or more of the mechanical means for replicating angular motions of the master end at the slave end are adapted to be removably mounted to modified Steadicam®-type equipment.

When the support system has a rigid axial connection, for example in the form of an active balance pole, a handgrip can be employed that is connected to, but freely rotatable about, the balance pole.

Exemplary embodiments of the invention include handles having elements that work in conjunction with active gimbal elements to selectively isolate, and dampen unwanted motions, and orient the attitude of the balance pole with respect to the vertical.

A support system according to an illustrative embodiment of the invention, comprises a balance pole with a primary (master) end and a secondary (slave) end. One or more primary component masses are connected to and balanced at the balance pole master end on a support structure or master sled with a master gimbal apparatus, and one or more secondary component masses are connected to and balanced at the balance pole slave end on a support structure or slave sled with a slave gimbal apparatus. A primary gimbal apparatus having a primary yoke is non-rotatably connected to the primary end of the balance pole. A secondary gimbal apparatus having a secondary yoke is non-rotatably connected to the secondary end of the balance pole. A tertiary gimbal is attached to the balance pole at its center of balance so the balance pole can rotate within it to provide a first degree of angular connection between the primary and secondary yokes. A primary pulley tree is attached to an outer race housing of the primary gimbal, and a secondary pulley tree is attached to an outer race housing of the secondary gimbal. A primary center post is disposed within an inner race of the primary gimbal, and a secondary center post is disposed within an inner race of the secondary gimbal. A pair of tie rods is disposed substantially parallel to the balance pole and to one another and extending from the primary pulley tree to the secondary pulley tree, each tie rod attached pivotally at each pulley tree, such that the balance pole, tie rods and center posts form a parallelogram, which provides a second degree of angular connection between the primary and secondary center posts. Each pulley tree has a plurality of pulleys functionally connected with an endless line such that motion of the primary gimbal is replicated at the secondary gimbal to provide a third degree of angular connection. Accordingly, the orientation of the master gimbal is mimicked by the slave gimbal.

The support system may include at least one vibration control system to dampen vibration imparted to a center post. In an illustrative embodiment of the invention, the vibration control system comprises a mounting bracket rigidly attached to a pulley tree and at least partially encircling a center post, wherein the mounting bracket has a plurality of idler rollers and is adjustably positioned to allow the idler rollers to contact the center post.

The invention further includes various embodiments of a handle assembly that can be used with a support system having a balancing pole. In an illustrative embodiment of the invention the handle assembly comprises a balance pole gimbal in functional connection to, and longitudinally slidably disposed on, the balance pole. The balance pole gimbal has an outer race that is attached to a handle support bracket at a proximate end of the handle support bracket. The handle support bracket has a notch to accommodate the tie rods as the support system is rotated. The handle support bracket is further attached to a handle shaft at a distal end of handle support bracket, the handle shaft extending in a direction substantially perpendicular to a center line of the balance pole. A grip is disposed about the handle shaft and rotatable about a longitudinal axis of the handle. An arm mounting assembly can also be included, which is attached to a distal end of the handle shaft to mount a support arm. The arm mounting assembly is rotatable with respect to the support arm about a substantially vertical axis, which is substantially perpendicular to the longitudinal axis of the handle shaft.

The handle support bracket can be connected via connection components attached to the balance pole gimbal outer race, and complimentary connection components attached to the handle support bracket. Resilient components are disposed between the balance pole gimbal outer race handle support bracket connection components and the complimentary connection components so that motion of the handle support bracket substantially perpendicular to the longitudinal axis of the handle shaft will be dampened by the resilient components. In a particular embodiment of the invention, the connection components protrude from the outer gimbal race, and the complimentary components are u-shaped components that straddle the projections, with the resilient components disposed therebetween.

The invention includes modification of a support system by attaching a gimbal and handle apparatus as disclosed herein.

The invention further comprises an extension pole for a camera support system having a gimbal and handle apparatus according to any of the embodiments provided herein. The invention also includes a support system having such a balance pole.

The support system may be attached to an articulated arm, and further the articulated arm may be attached to an operator's vest. Preferably the articulated arm is an equipoising arm. The invention also includes the support system with the articulated arm.

The invention is also directed to methods of balancing and utilizing equipment by providing a support system according to any of the embodiments of the invention; balancing the primary component masses with respect to one another at the primary end; balancing the secondary component masses with respect to one another at the secondary end; balancing the primary masses with respect to the secondary masses about the longitudinal axis of the balance pole; balancing the balance pole and the primary and secondary masses by positioning the tertiary gimbal along the balance pole length; and moving the primary gimbal apparatus, thereby causing the movement replicating apparatus to mimic the movement in the secondary gimbal apparatus at the slave end while maintaining the approximate balance of the component masses.

DESCRIPTION OF THE DRAWINGS

The invention is best understood from the detailed description when read in conjunction with the accompanying drawings.

In FIG. 34, the support bracket is rendered transparently to illustrate its relationship to the resilient pads, the outer race extensions and the pivoting axle and bearings.

DETAILED DESCRIPTION OF THE INVENTION

Figure 1:
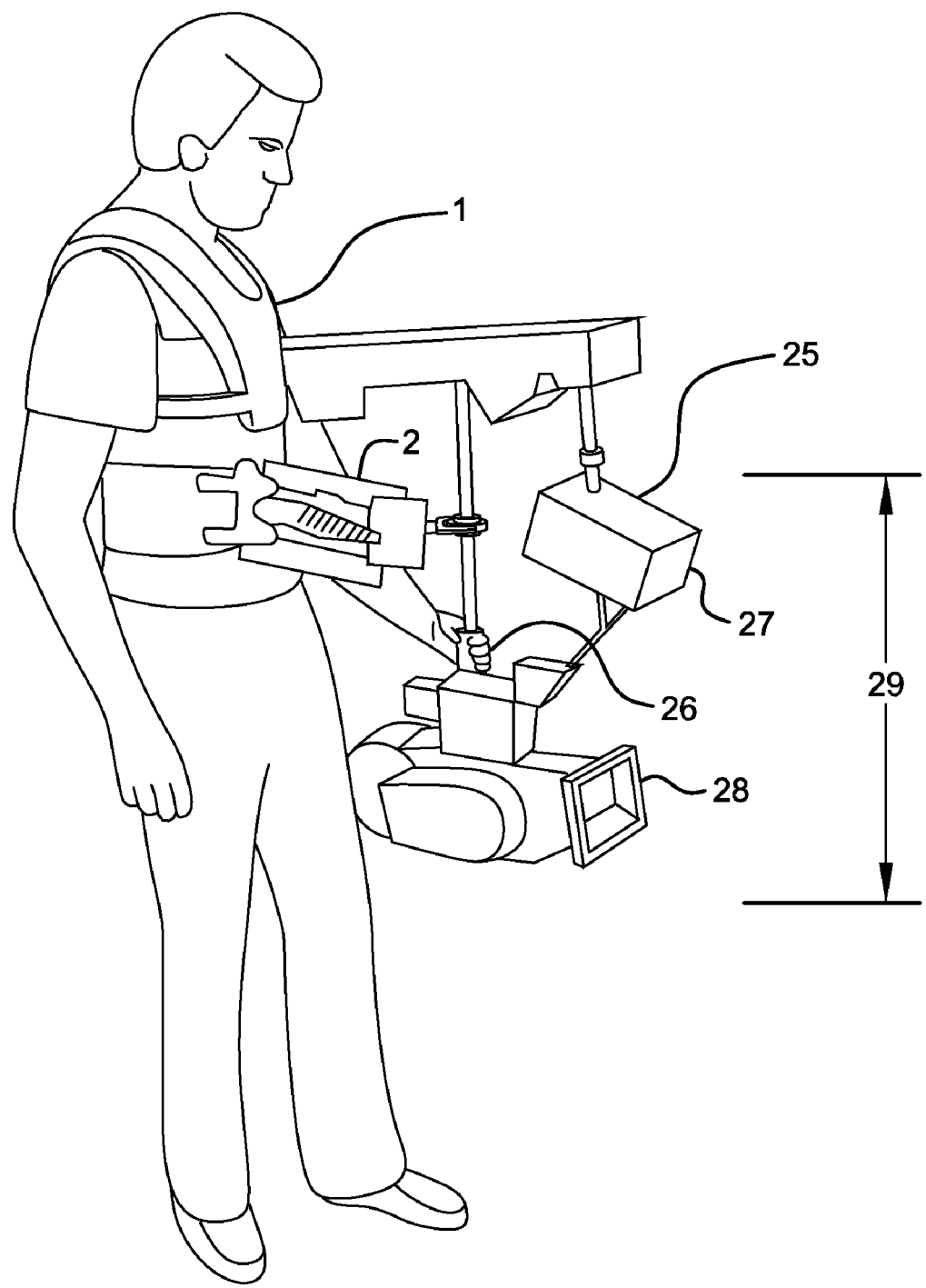
FIG. 1 is a prior art camera support and stabilizing system shown in 'low-mode' with the camera underslung.

In general, illustrative embodiments of the invention employ an inherently stable and controllable sled of the Steadicam-type for example, (gimbaled roughly at its center-of-balance and rendered angularly inert by expanded masses) as a 'servo controller' to cause a secondary, spatially-displaced, 'slave sled' to synchronously pan, tilt and/or roll at the other end of an a balance pole. The balance pole is supported by its own gimbal at its own center of gravity.

Exemplary embodiments of the invention employ a plurality of substantially frictionless rotation-sensors to detect three mutually perpendicular rotations at the master sled gimbal as it is moved and aimed with respect to the momentary orientation of the attached balance pole. These rotations are then reproduced by a plurality of servo motors at the analogous slave sled gimbal mounted at the opposite end of the balance pole. Some of these 'slaved' rotations are caused by deliberate angular re-orientations of the master sled. Others can be manifest as rotations in all three axes at the master sled gimbal, yet are only caused by traversing and/or elevating moves of the balance pole itself; in which case, the angular position of the master sled may not change, but any or all of the sensors can be registering rotations that, when reproduced at the slave gimbal, serve to keep the camera angularly static as well. In an alternative embodiment of the invention, there can be less than a one-to-one ratio of sensors to controlled degrees of angular motion of the camera or equipment or less than a one-to-one ratio of motors to controlled degrees of freedom. For example, a single sensor can sense motion around more than one axis, and/or a single motor can generate movement about more than one axis.

The balance pole can be extendable by, for example a telescopic or modular structure. The master sled and slave sled can be releasable from the balance pole. With the attachment of various weights to the master sled, it can counterbalance the miniature slave sled at 'see-saw' ratios of, for example, 16:1. Assuming a lightweight pole, such as composed of carbon fiber, the weight of the master sled vs. the weight of the miniature sled will roughly equal the inverse ratio of the distances between sleds and the balance pole gimbal. A three-pound slave sled 24 feet from the gimbal can therefore be counterbalanced by a 48 lb master sled 1.5 feet away. Adding a hypothetical 9 lbs for the long pole and its gimbal, the total is 60 lbs, which is well within the top-end loads camera operators routinely support.

Other illustrative embodiments of the invention, may substitute the direct mechanical axial connection of the balance pole for swiveling servo connections of master sled and slave sled to the axis of the balance pole. This mechanical interconnection employs the balance pole itself, in axial rotation, to lock, one-for-one, the axis of rotation of the slave and master gimbal yokes, in what is designated as the 'pitch' axis.

Other mechanically interlocked configurations may replace one or more of the remaining electronic servo connections using other known types of mechanical inter-connection, such as toothed belts, lines or cords functionally connected to toothed gears or pulleys, and line combinations, which can synchronize gimbal-yoke angles and pan angles between the master and slave sleds.

Additionally, mechanically interlocked embodiments of the invention may employ tie rods and/or pulley interconnections to interconnect second and/or third horizontal or vertical axes of rotation to eliminate counterweights above or below the slaved camera gimbal and proportionally below or above the master sled gimbal, and thus cause the remaining master sled counterweights to effectively balance the slave sled camera and permit angular control as if master and slave sleds were interconnected above and below on a single virtual center post. This arrangement can enable the use of heavier cameras without the necessity of symmetrically counter-weighting either the slave or master sleds, and may therefore reduce the total weight of the invention potentially by nearly half. Additionally, mechanically locked embodiments of the invention may employ paired tie rods connected between symmetrical crank sets extending laterally from each of the master center post and the slave center post in order to synchronize pan motions (up to plus/minus 180° of rotation. If displaced appropriately above or below the respective master and slave gimbals, such tie-rod pairs can also serve to synchronize pitch angles between the master and slave posts.

Additionally, mechanically locked embodiments may employ singular tie-rods with yokes, or paired tie rods to functionally interconnect master and slave outer gimbal bearing races in combination with dentist-drill-type pulley and line sets to synchronize elevation and pan motions between master and slave sides with no or minimal limitation in degree of synchronous pan rotation.

Mechanically locked embodiments employing one or more tie rods may be manipulated and oriented by means of an 'active gimbal handle' that integrates some angularly isolating gimbal components within the handle structure. A notch can be provided between the balance pole and the handle grip sufficient for the excursion of the tie rods when the balance pole is caused to 'pitch' up or down as much as 90°.

FIG. 1 depicts a prior art stabilizing camera support system, known as a Steadicam®, deployed in 'low-mode' with camera 28 underslung. The maximum vertical range of potential lens heights is indicated by line 29.

Figure 2:
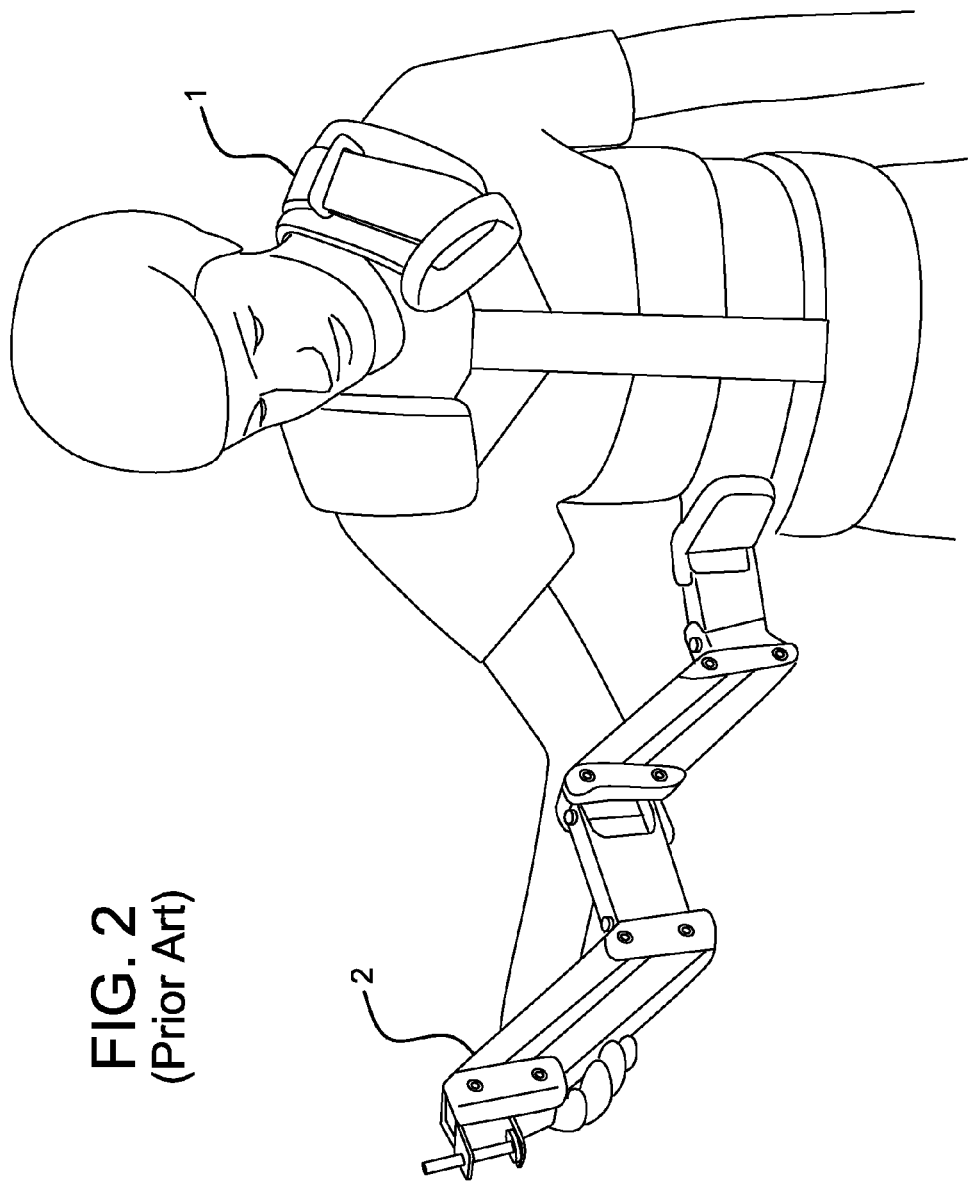
FIG. 2 is a front view of a typical prior art lightweight vest and articulating support arm.

FIG. 2 provides a front view of a typical prior art lightweight 'vest' 1 and articulating support arm 2 which can be used to spatially isolate and support, or a part of embodiments of the invention.

Figure 3:
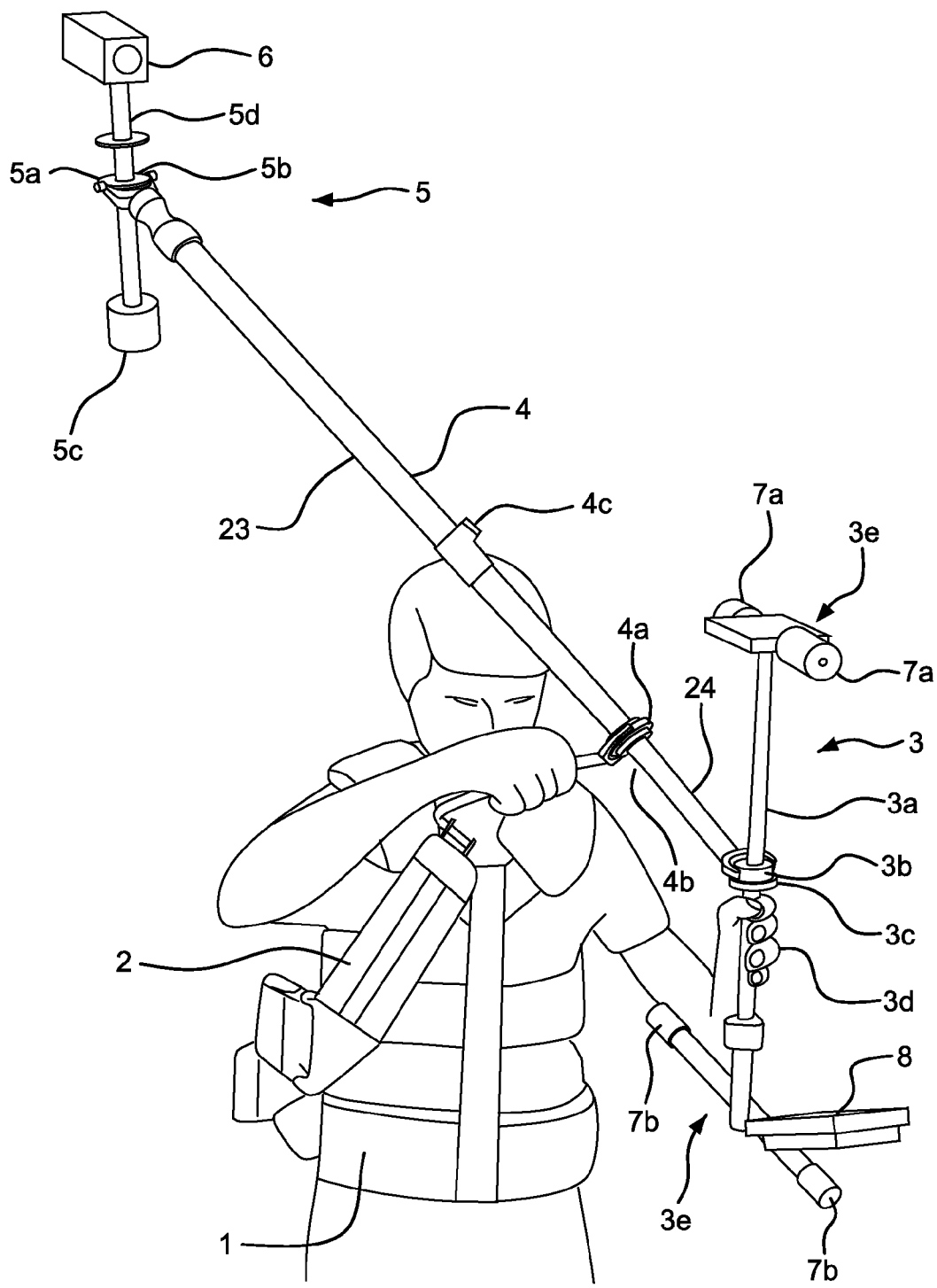
FIG. 3 shows an illustrative embodiment of the invention deployed for maximum lens height.

FIG. 3 shows an illustrative embodiment of the invention deployed to obtain the maximum lens height for camera 6. Arm 2 is attached to vest 1 and is raised to the limit of its travel. Arm 2 is attached to balance pole 4 by means of pole gimbal 4a located between master sled 3 and slave sled 5 at the center-of-balance 4b of the apparatus.

Master sled 3 is attached to balance pole 4 at master sled gimbal 3b. Master sled gimbal 3b provides three degrees of angular isolation between balance pole 4 and center post 3a. In FIG. 3, balance pole 4 is pitched up to maximally elevate camera 6. Slave sled 5 is attached to pole 4 at slave gimbal 5b. Slave sled 5 is oriented by servo motors (shown for example in FIG. 6) to duplicate the positions and angular movement at master gimbal 3b. The servo motors respond to signals based on information from sensors located at master sled 3 (see for example FIG. 5). Signals from sensors at the master sled may be conditioned, such as by servo amplifiers and/or software. The operator views the remote image from camera 6, which is located at master sled 5 on monitor 8.

Servo motors are used as an example in illustrative embodiments of the invention presented herein. Other sensor/motor combinations are within the scope of the invention. Preferably the sensor/motor combination will be a closed loop control system. For many applications low vibration, and low noise are desirable. High speed, for example about 3000 rpm to about 5000 rpm may also be desirable. In an illustrative embodiment of the invention, the resolution is in the range of about 1000 pulses per revolution to about 10,000 pulses per revolution. In an alternative embodiment a stepper motor or the like is used, which may lessen lag time between the motion of the master sled and slave sled, but such motors are not closed loop and tend to have higher noise and vibration.

Figure 4:
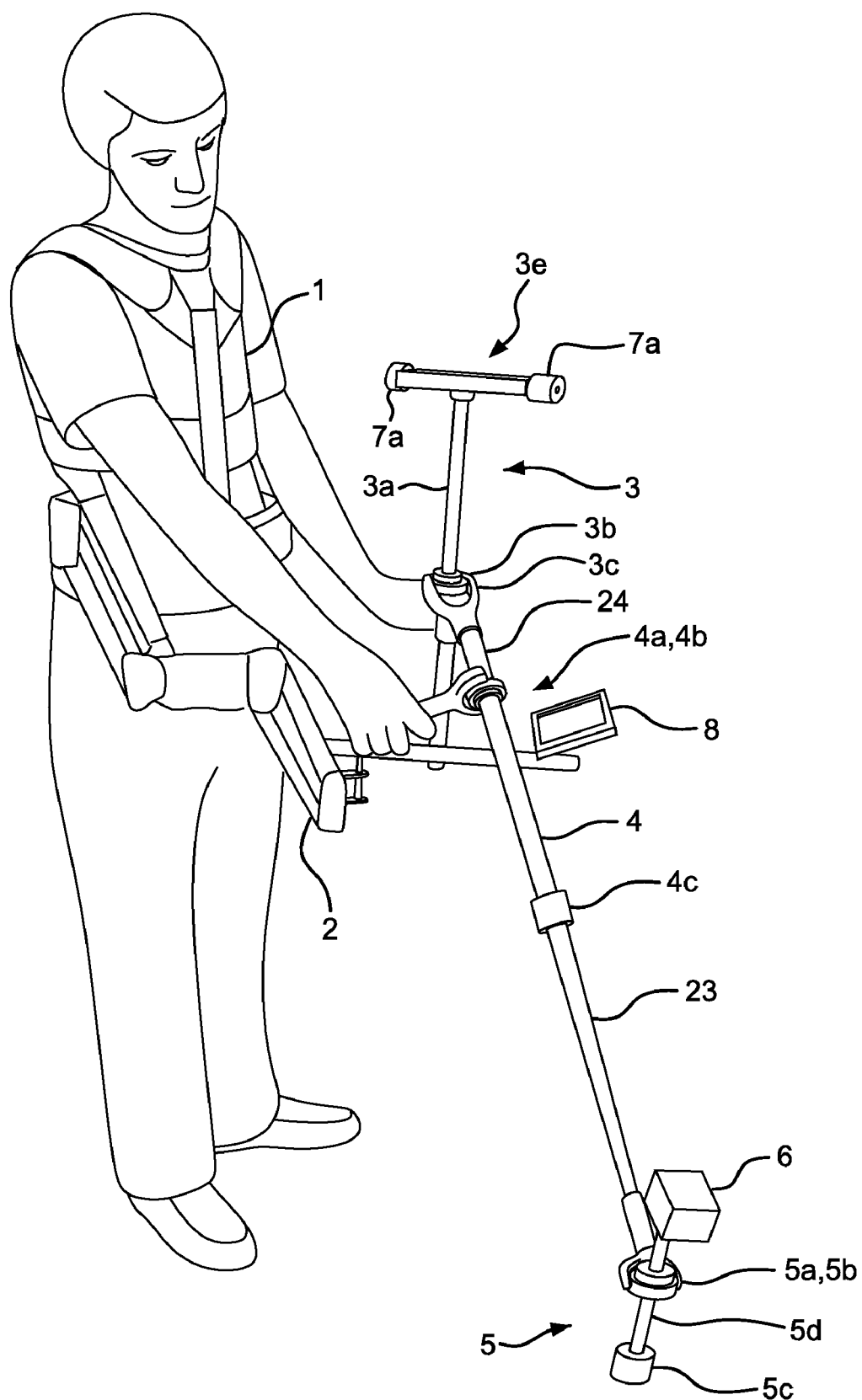
FIG. 4 shows an illustrative embodiment of the invention deployed for minimum lens height.

FIG. 4 shows an illustrative embodiment of the invention deployed for minimum lens height of camera 6. Arm 2 is depressed to the lower limit of its travel and balance pole 4 is angled downward. Camera 6 on slave sled 5 is aimed in a direction based on the orientation of Master sled 3. In a particular embodiment of the invention, camera 6 remains aimed in the same direction as master sled 3. This is accomplished by sensing, preferably continuously, the momentary angle between master gimbal 3b and balance pole 4, or other spatial relationship that changes as master sled 3 is repositioned, and reproducing that angle (or other measurement) by means of motors, such as servo motors, (not shown) arranged to drive, and thus synchronously reposition elements of slave gimbal 5b.

The interconnection between the master and slave components can be mechanical or electrical. It is noted that the motors and sensor can be hard-wired to one another or can be wirelessly connected. Mechanical connections can include tie rods, pulleys, gears or similar devices. A mechanical linkage connected in a manner based on parallelograms, such as used in a pantograph to translate movement of a primary point to the movement of a secondary point can be adapted for use in embodiments of the invention. This can include amplification or reduction of movement from the primary to secondary point, or one-to-one correspondence.

The figures generally show a camera located at the slave end of the apparatus and a monitor located at the master end. In an alternative embodiment of the invention, a camera is installed at both the slave and master ends of the apparatus for simultaneous filming.

FIG. 4 shows balance pole 4 as a telescoping component with a telescoping clamp 4c. Pole 4 may also be non-telescoping.

Figure 5:
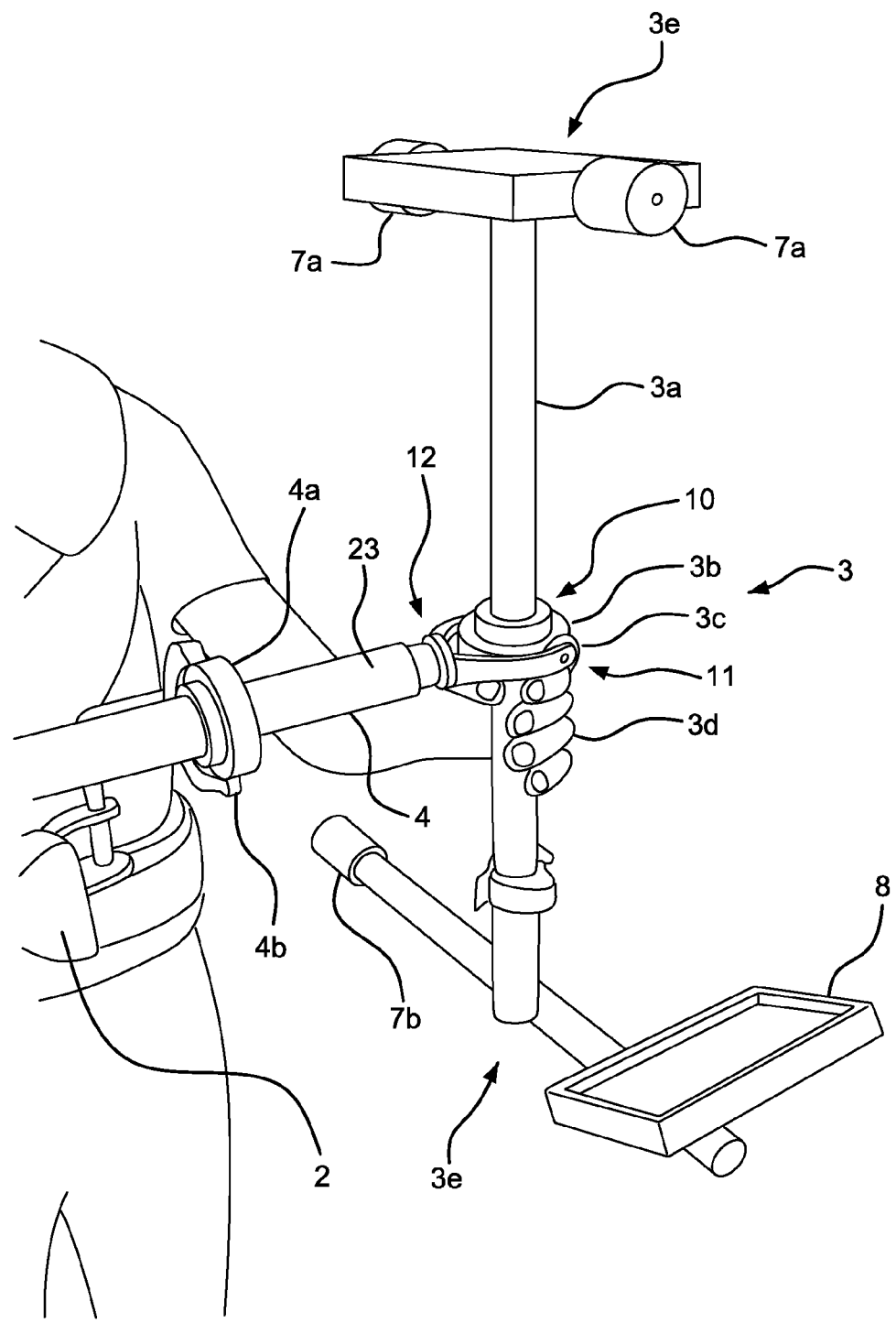
FIG. 5 shows a master sled according to an illustrative embodiment of the invention.

FIG. 5 shows a closer view of master sled 3 according to an illustrative embodiment of the invention. Gimbal 3b is located just above center-of-balance 3c. Counterbalancing equipment 3e, consists of upper equipment 7a and lower equipment 7b, including monitor 8. Various other components can be including in the counterbalancing equipment such as a camera CCU (camera control unit) and associated batteries, microwave transmitters, lens-control amplifiers, etc. Non-functional masses can also be used as weights. The operator's hand controls the attitude of master sled 3 at position 3d (preferably as near as possible to center of balance 3c). Sensors 10, 11 and 12 detect the angular position (in three mutually perpendicular axes) of center post 3a relative to balance post 4. Balance post 4 is supported by gimbal 4a at its own center of balance 4b. Master sled 3 can be for example, in all respects a Steadicam® sled except that it does not necessarily include a camera (which is instead mounted remotely, such as shown in FIGS. 4/5). Master sled 3 is rendered angularly inert by positioning masses at selectable distances from the center post, and is isolated by gimbal 3b and arm 2 from the unwanted motions of the operator. Preferably it is balanced to be slightly bottom heavy, adjusted to hang approximately level, such as by vernier balance adjustments for example, and can be oriented in any angular direction by, for example the operators hand at location 3d. The apparatus can be configured to allow the lightest touch of the operator's hand to orient master sled 3. Master sled 3 is rendered inert in all three axes of pan, tilt, and roll by selectively positioning the upper and lower sets of counterweight equipment 7a and 7b and monitor 8 at various distances from the center post. Sensors 10, 11 and 12 preferably operate substantially frictionlessly, and therefore do not degrade angular stability. Master sled 3 may thus provide a stable, angularly agile reference platform that can be aimed at will by the operator, and thereby control the remotely positioned slave sled 5 and its attached camera 6. Master sled 3 maintains its angular orientation even when balance pole 4 is being elevated or traversed, and therefore so also does the slave sled 5 and camera 6, which thus correspondingly both 'backpans' and 'backtilts' to negate or reduce angular effects produced by traversing and/or elevating balance pole 4.

Figure 6:
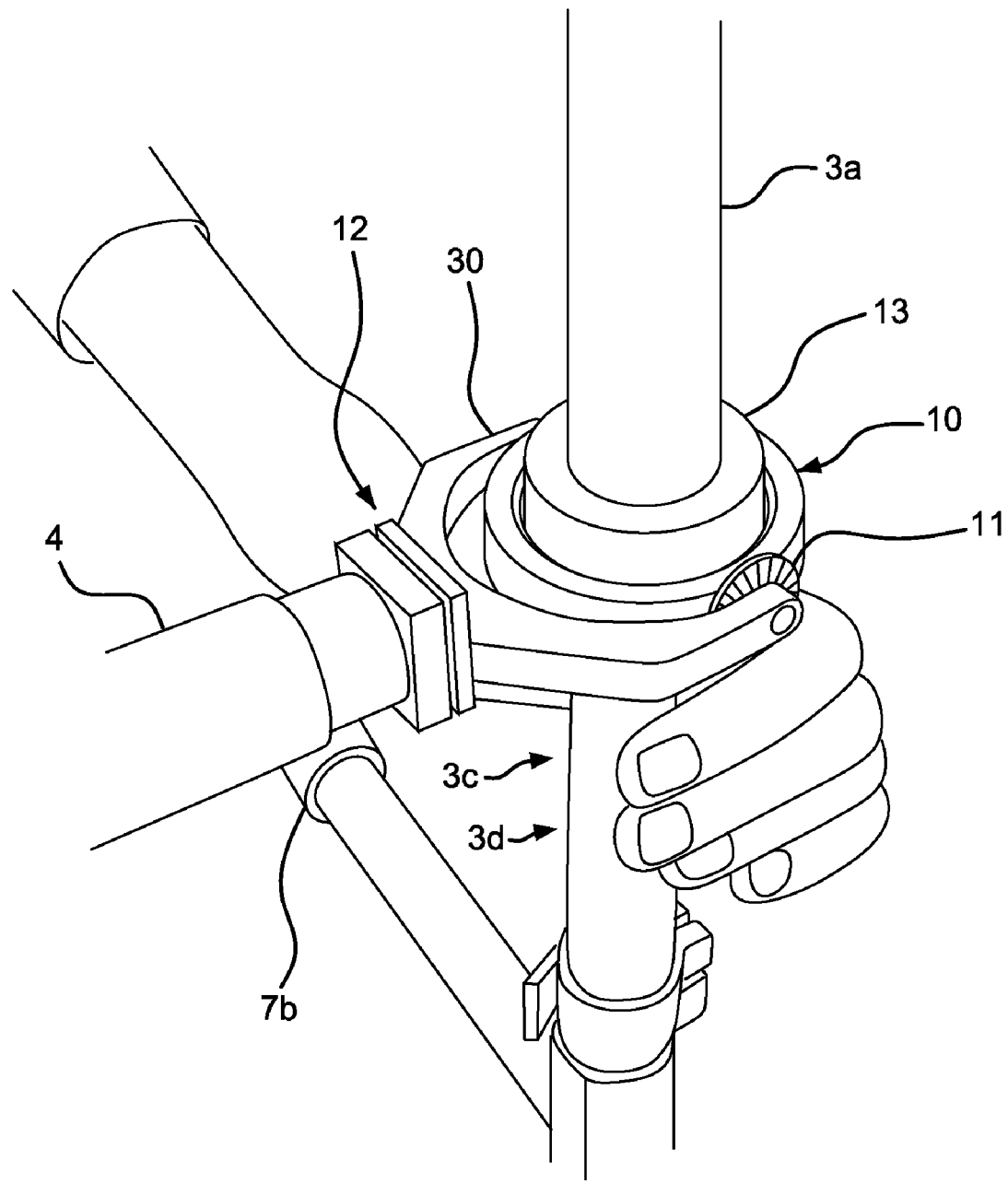
FIG. 6 is an enlarged view of the gimbal portion of the master sled detailing three rotation sensors according to an illustrative embodiment of the invention.

FIG. 6 is an enlarged view of the gimbal portion 3b of the master sled 3 showing sensors 10, 11, 12 according to an illustrative embodiment of the invention. In this embodiment, sensors 10, 11 and 12 are positioned mutually perpendicular to one another, and each senses rotation in one of the three mutually perpendicular directions. The directions may be for example pan about the longitudinal center post axis, pitch about a master sled gimbal axis perpendicular to the pan axis, and roll about the balance pole longitudinal axis, which is mutually perpendicular to the pan and pitch axes. Other sensor positioning and degrees of freedom included are within the scope of the invention. The momentary angle between center post 3a and post 4 resolves into three mutually perpendicular component angles that are detected by the three sensors 10, 11 and 12. Sensor 10 records the angle between center post 3a and the plane of a pan bearing race of gimbal 3. Sensor 11 records the angle between the plane of yoke 30 and center post 3a. Sensor 12 records the angle between the plane of yoke 30 and post 4. These detected angles are then transmitted to the analogous servo motors on slave sled gimbal 5b and reproduced so that the camera on slave sled 5 is synchronously aimed. Slave sled gimbal 5b and counter weight equipment 5c (shown in FIG. 4 for example) serve to keep slave sled 5 and camera 6 stabilized during repositioning resulting from servo motors 10, 11, 12.

Figure 7:
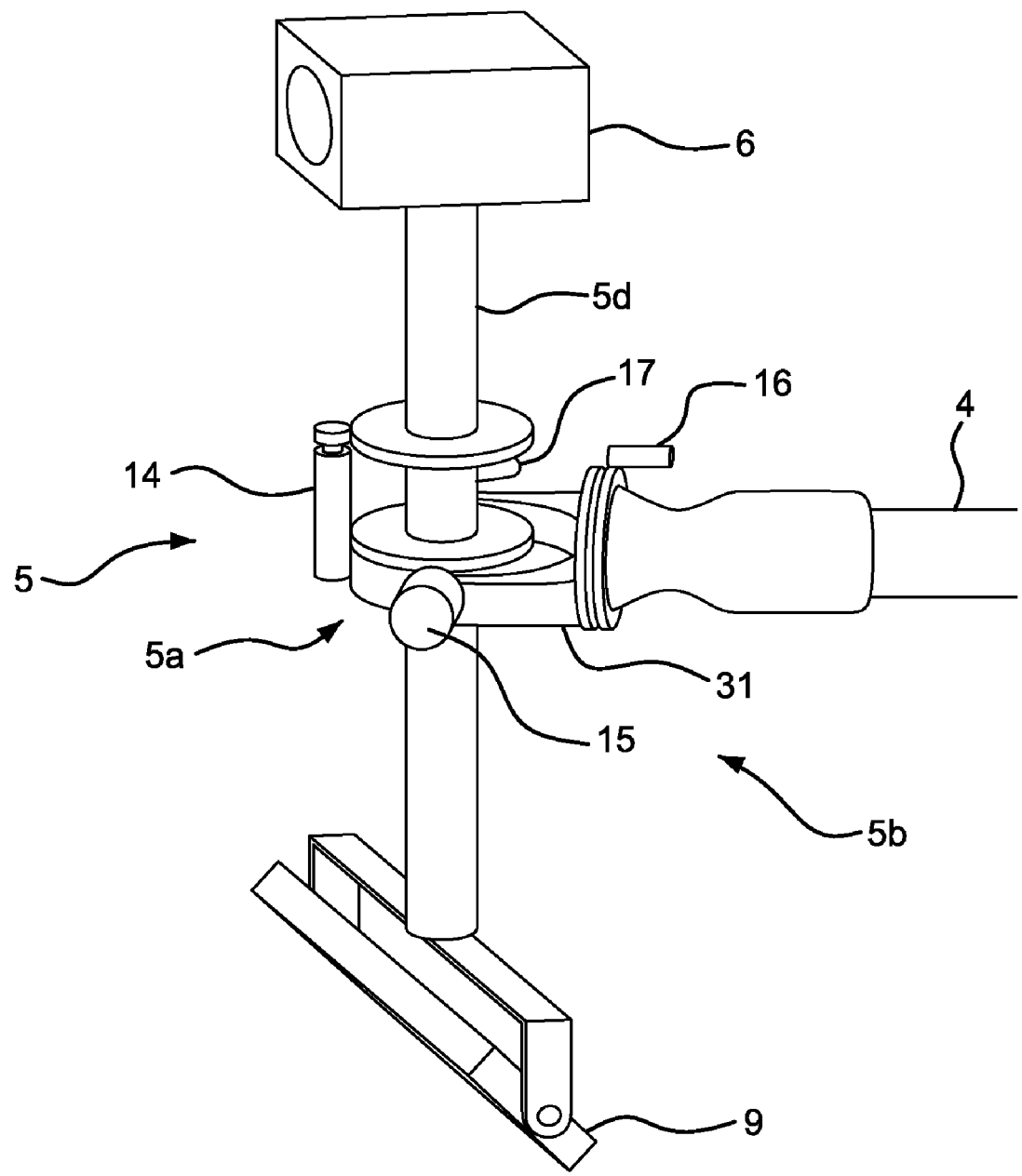
FIG. 7 is shows a slave sled detailing three servo motors, and the camera and miniature auxiliary monitor positions according to an illustrative embodiment of the invention.

FIG. 7 is an enlarged view of slave sled 5 showing the location of three servo motors, 14, 15 and 16, as well as camera 6 and auxiliary monitor 9 according to an illustrative embodiment of the invention. In response to positioning data produced based on motion of the master sled or components thereon, motors 14, 15 and 16 continuously control the angular relationship between slave center post 5d and balance pole 4, to correspond with that of the master sled. The result is that camera 6 is always aimed in the same direction as the master sled, and the operator can intuitively pan, tilt and roll the master sled and observe, by means of either a master monitor or the slave monitor 9, that his intended camera moves are being accomplished. In alternative embodiments of the invention, motion at the slave sled can be amplified, reduced, or have a one-to-one correspondence with motion at the master sled. The relationship between motion at the slave sled and master sled can be proportional, inversely proportional, or have another relationship as dictated by the sensor/motor system configurations and/or the configuration of the support system.

FIG. 7 depicts motor 16, which controls the axial angle between post 4 and the plane of slave gimbal yoke 31. Motor 15 controls the angle between the plane of yoke 31 and a pan bearing race on slave gimbal 5. Motor 14 controls the angle between center post 5d and the aforementioned slave bearing race. In a preferred embodiment, gimbal 5b is positioned at slave sled center-of-balance 5a and locked in place with respect to post 5d by clamp 17 so that the balance of slave sled 5 would be neutral and have no influence on the angle of balance post 4 with respect to post 5d.

Figure 8:
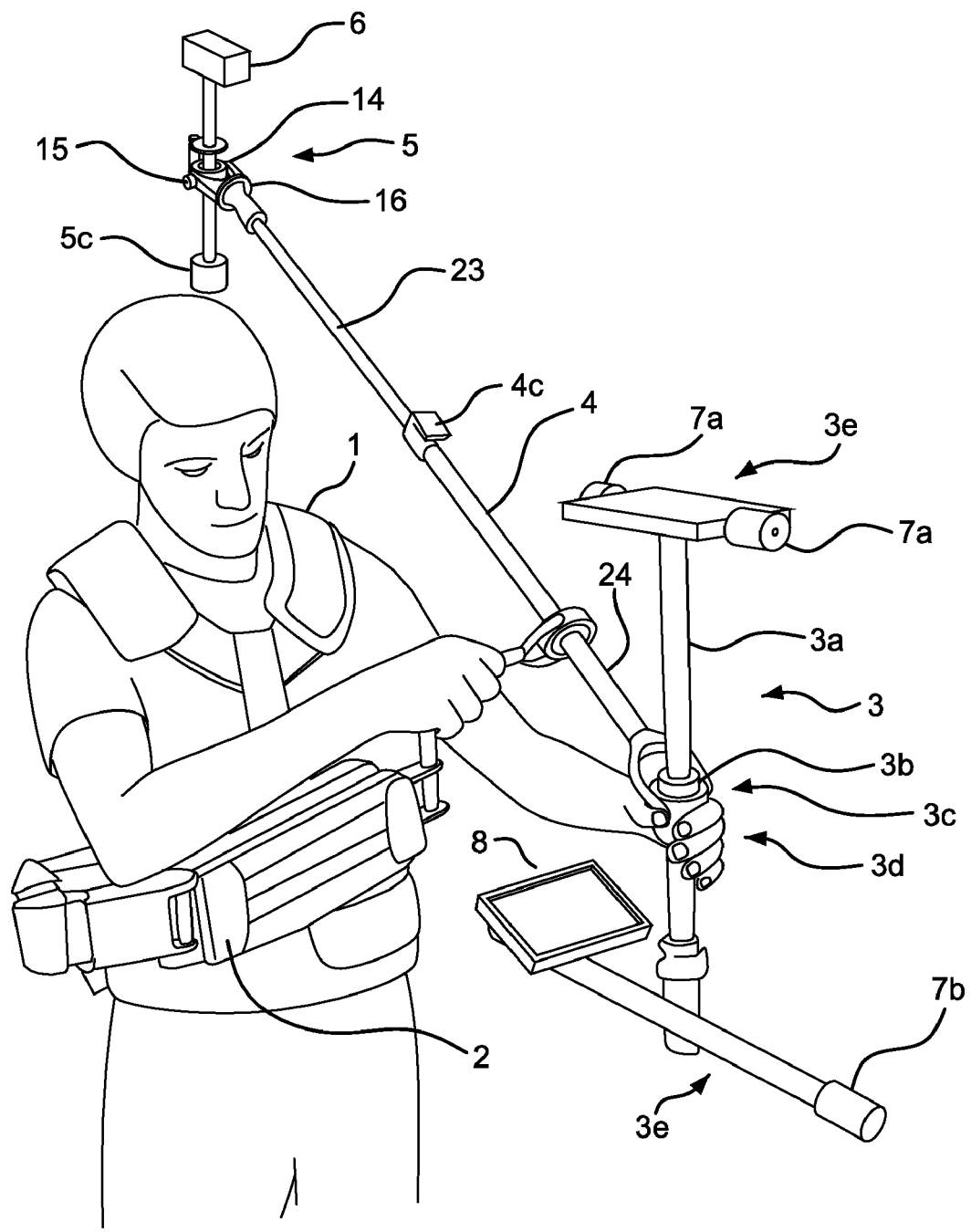
FIG. 8 shows an illustrative embodiment of the invention deployed to shoot above and straight behind the operator.

FIG. 8 shows an illustrative embodiment of the invention deployed in such position and orientation as to shoot above and straight behind the operator. Master sled 3 is aimed to the rear. Balance pole 4 is tilted upward and to the rear. The operator views the correspondingly oriented remote image from camera 6 on master sled monitor 8. Such extreme tilt angles may increase the risk of collisions between some portion of counterweight equipment 3e and pole 4, but these potential interferences are easily avoided by selecting appropriate body positions and post angles for obtaining the desired shot. Since the operator is ambulatory, camera angles that are potentially occluded by some part of the equipment can often be cleared by employing a slightly different body position.

Figure 9:
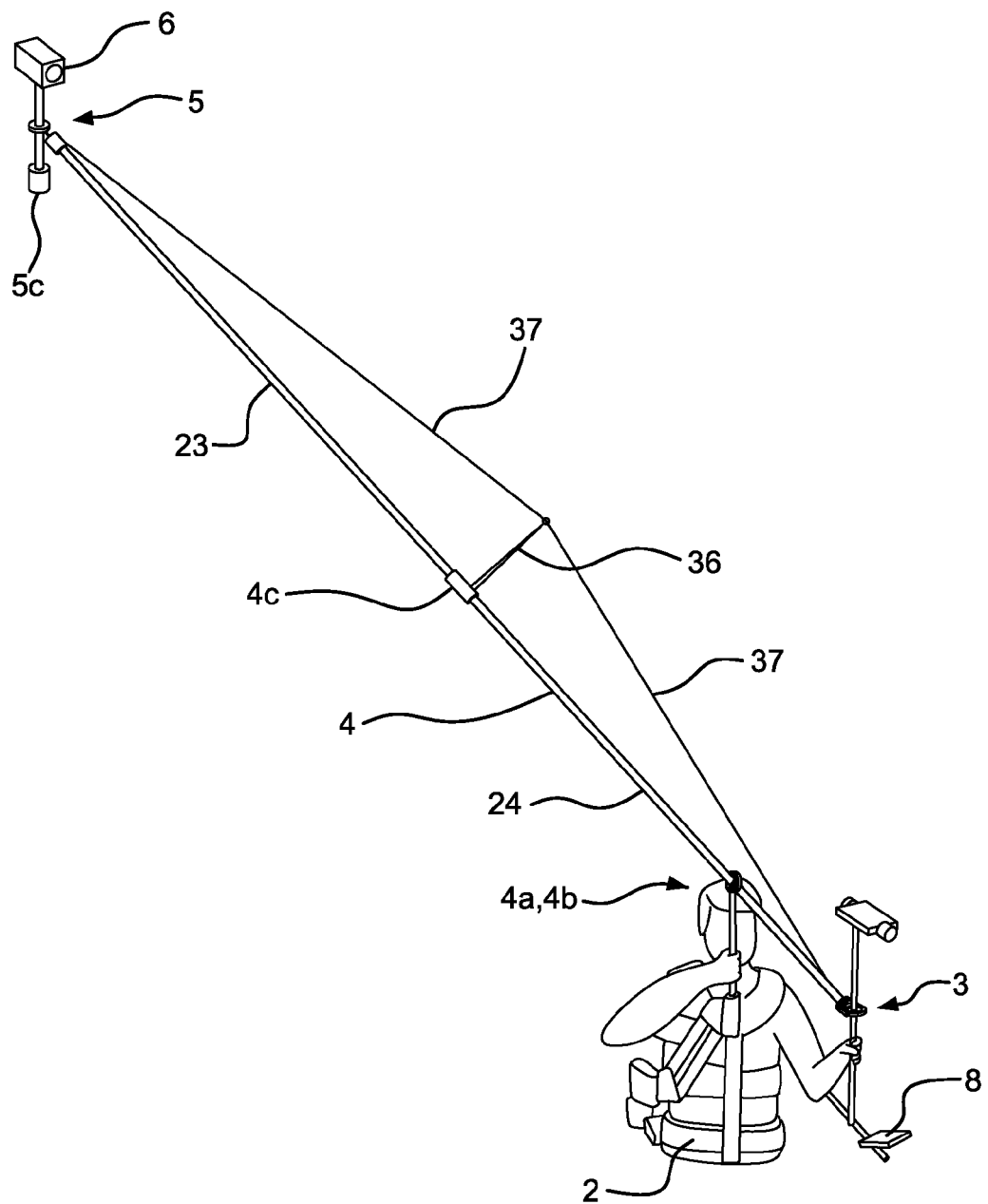
FIG. 9 shows an extended extra-long balance pole deployed between the master and lave sleds according to an illustrative embodiment of the invention.

FIG. 9 shows a super-extended illustrative embodiment of the invention, comprising an extra-long balance pole 4 deployed between master sled 3 and slave sled 5. Extended balance pole 4 includes two segments 23, 24. In this configuration, pole segment 23 extends from gimbal 4a at center of balance 4b to slave sled 5. Pole segment 24 extends from gimbal 4a to master sled 3. By way of example, if the ratio of the distances from gimbal 4a to slave sled 5 and from gimbal 4a to master sled 3 is approximately 6:1, then the weight ratio between sleds 3 and 5 (discounting the negligible weight of the balance pole) must be inverse and of the same 6:1 proportion. This may be accomplished by adding or removing counterweights as required above and below the master sled gimbal 3b, and then adjusting the lifting power of arm 2. One or more optional sets of stays 36 and associated shrouds 37 can reduce or eliminate flexing of balance pole 4, thereby substantially maintaining its columnar structure and maintaining its balance about its longitudinal axis, as well as potentially reducing bouncing. Other devices to support or strengthen the balance pole can also be used, either separately or in conjunction with the stays and shrouds. Suitable choice of materials, such as particular composites or alloys, may eliminate or reduce the need for such devices. It is noted, however, that in some embodiments of the invention, the balance pole may not be columnar, but can bow to some extent.

Figure 10:
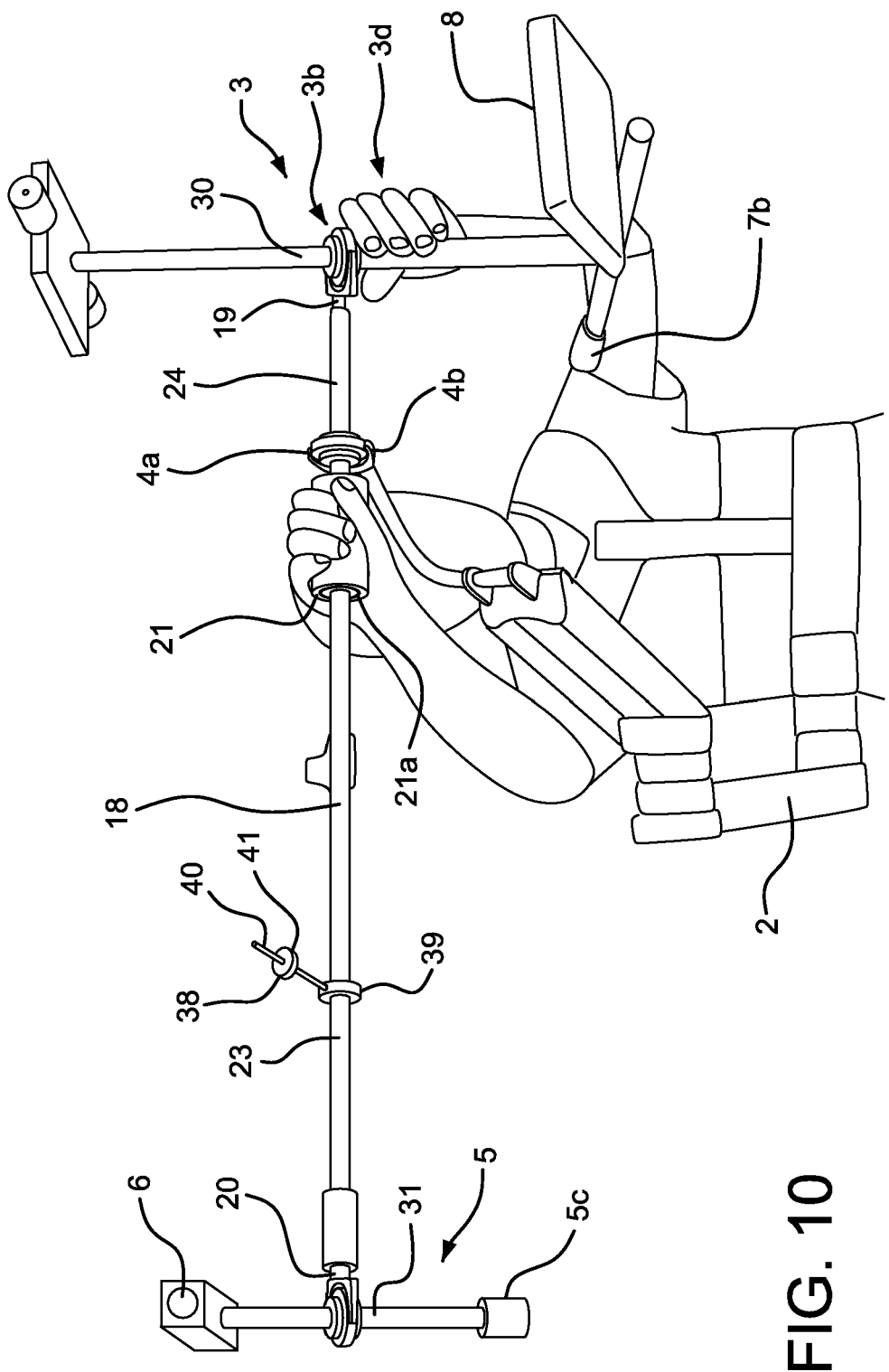
FIG. 10 shows an illustrative embodiment of the invention in which the gimbal yokes of the master and slave sleds are both hard connected to an 'active' balance pole, and thus axially synchronized by mechanical means.

FIG. 10 shows an alternate embodiment of the invention in which the gimbal yokes 30 and 31 of the master and slave sleds both have hard connections 19 and 20 to a rotatable, 'active' balance pole 18, and thus remain axially synchronized by mechanical means. This embodiment has a handgrip 21 having annular bearings 21a or other mechanism to isolate movement of the handgrip and pole 18 from one another. Forces applied by the operator to traverse and/or elevate post 18 are thus not transmitted angularly to post 18 and yokes 30 and 31, and master sled 3 thus remains in substantial angular isolation, excepting only slight axial friction from bearings 21a or other isolating mechanism. This illustrative embodiment of the invention requires only two sensors at the master sled gimbal, and two corresponding motors at the slave gimbal in order to be interconnected in all three axes—one by mechanical means and two by electrical means. Active balance pole 18 may optionally have one or more sets of shrouds and stays as illustrated in FIG. 9. Alternatively, or in addition to the stays and shrouds, a balancing weight clamp 38 can serve to balance pole 18 about its longitudinal axis by positioning adjustable weight 41 externally to active balance pole 18. Thus, clamp collar 39, which is connected to balance pole 18, is rotated so that so that threaded rod 40 is pointed in the direction that needs counter-weighting. Clamp collar 39 is then secured to balance pole 18 so it no longer can rotate about it. Adjustable weight 41 is then dialed inward or outward on threaded rod 40 until balance pole 18 is axially balanced. Use of either shrouds-and-stays and/or balancing weight clamp 38 can ensure that the balance of balance pole 18 does not affect the apparent individual balance of either master sled 3 or slave sled 5, about their centers of gravity.

Figure 11:
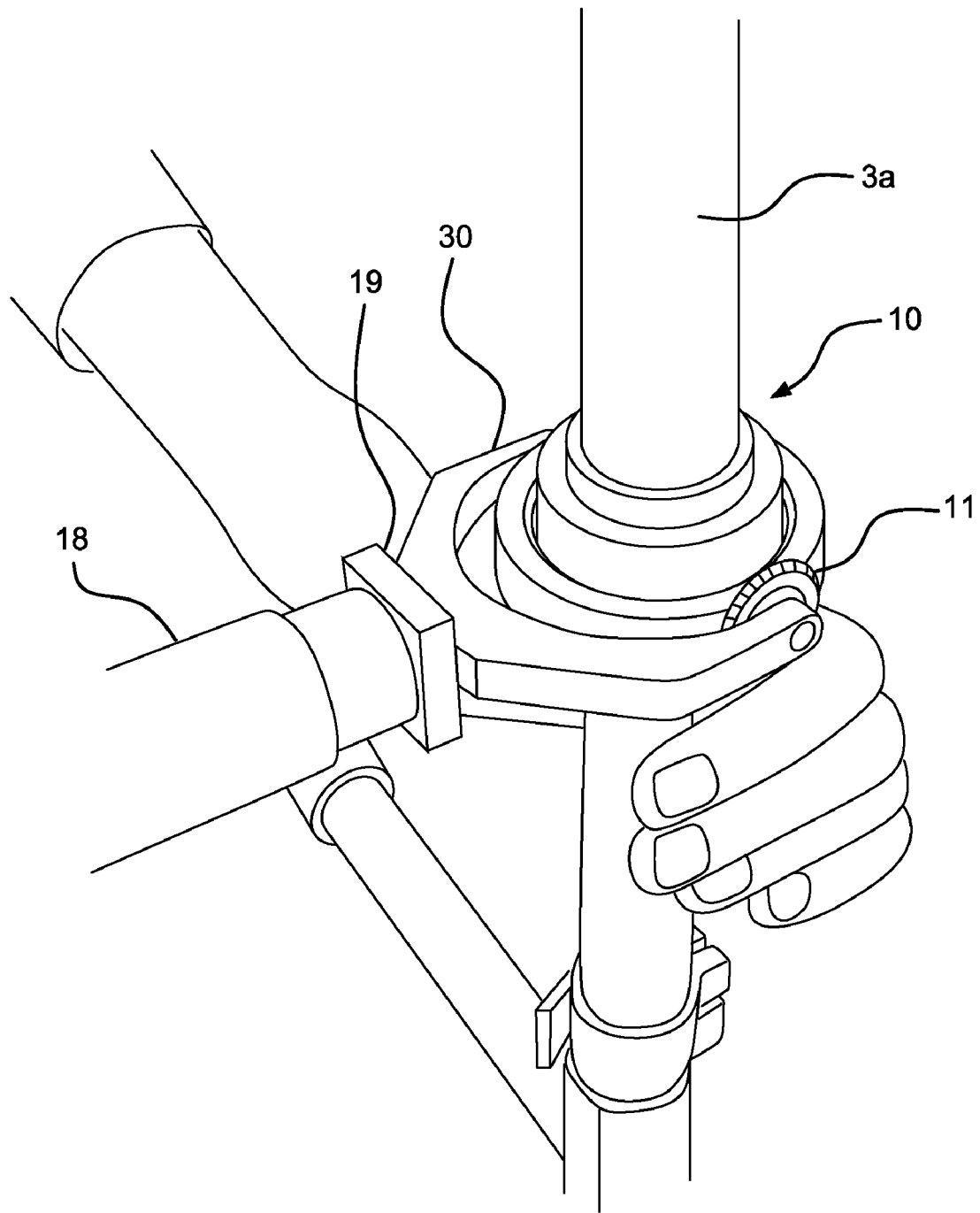
FIG. 11 shows a master sled gimbal yoke mechanically-connected to the active balance post according to an illustrative embodiment of the invention.

FIG. 11 shows an enlarged view of the master sled gimbal 3a showing the mechanical attachment of yoke 30 to active post 18 by means of hard axial connection 19. Two remaining rotation sensors, 10 and 11 implement the servo connection of their respective axes to their counterparts on the slave sled.

Figure 12:
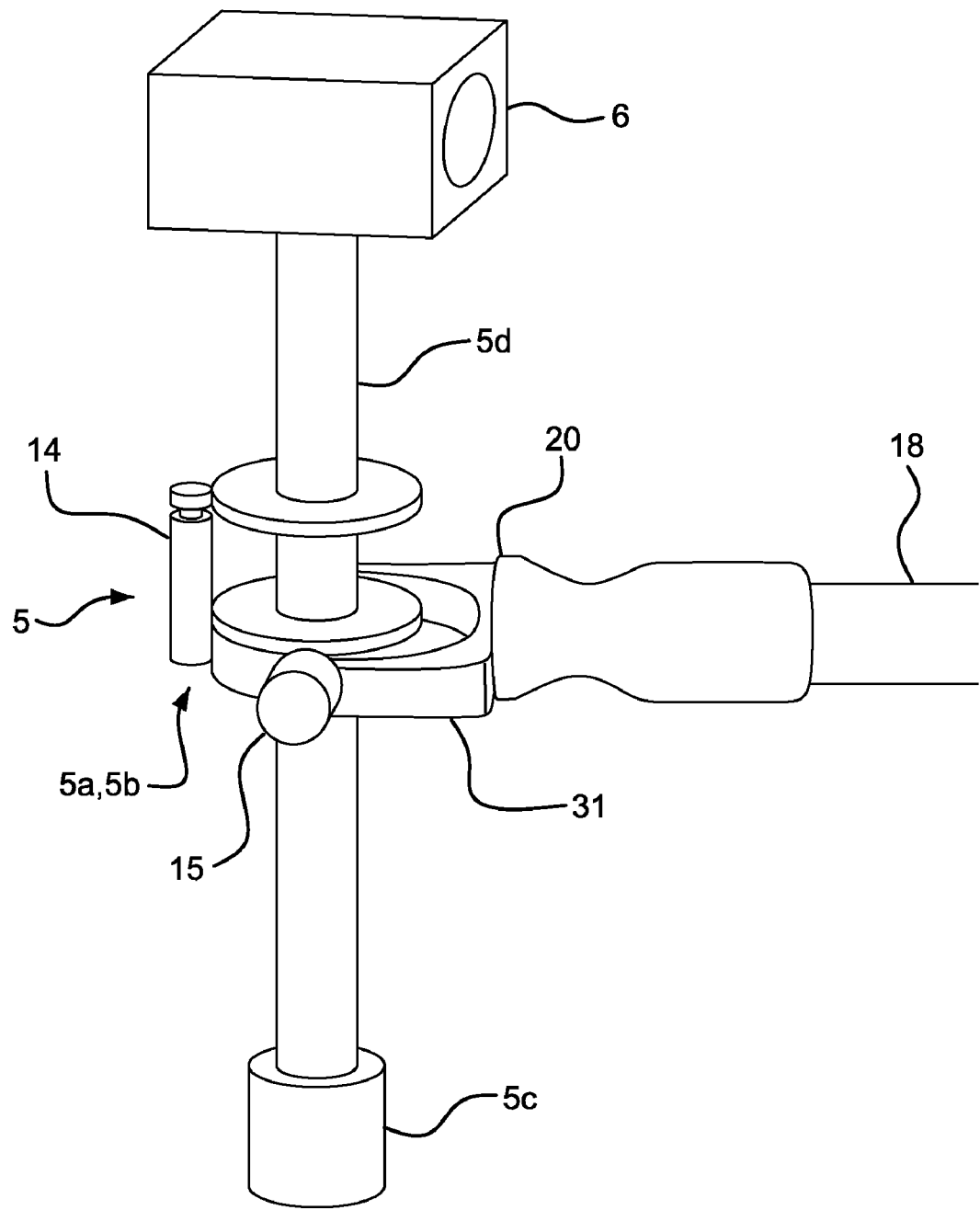
FIG. 12 shows a slave sled yoke mechanically connected to the active balance post according to an illustrative embodiment of the invention.

FIG. 12 shows an enlarged view of the slave sled yoke 31 of FIG. 10, which is attached by means of hard axial connection 20 to active balance post 18. Motors 14 and 15 receive electrical impulses, for example from servo-amplifiers, and synchronize their corresponding axes according to the sensor inputs derived at the master sled so that camera 6 maintains the same angular attitude in all three axes as does the master sled.

Figure 13:
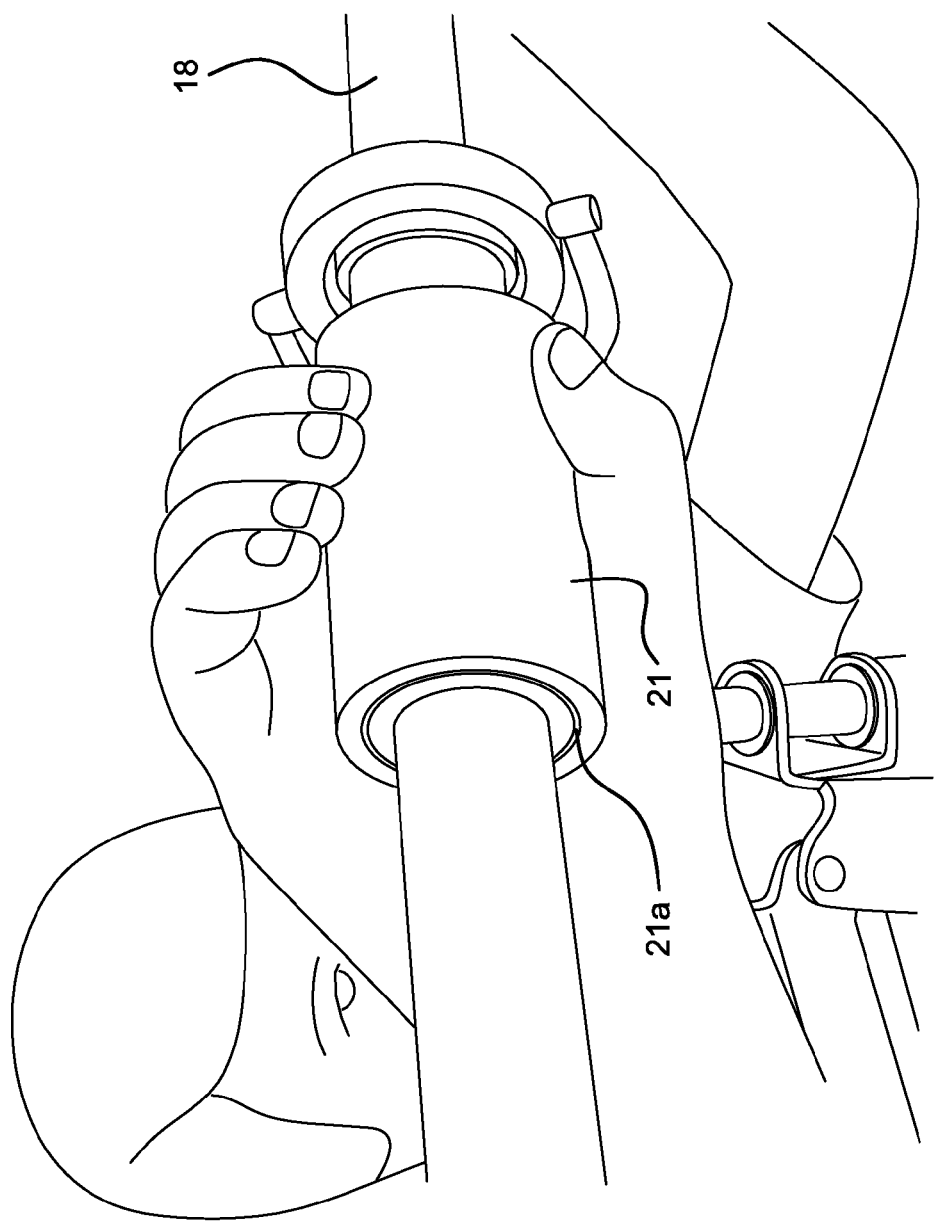
FIG. 13 shows an annular, axially isolated handgrip for elevating and traversing the active balance pole according to an illustrative embodiment of the invention.

FIG. 13 shows an enlarged view of an annular, axially isolated, handgrip 21 for elevating and traversing the active balance pole 18 of the illustrative embodiment of the invention shown in FIG. 10, in which a mechanical connection is substituted for one of the three servo connections. Annular bearings 21a prevent strong traversing and/or elevating motions of the handgrip from having an angular influence on pole 18.

Figure 14:
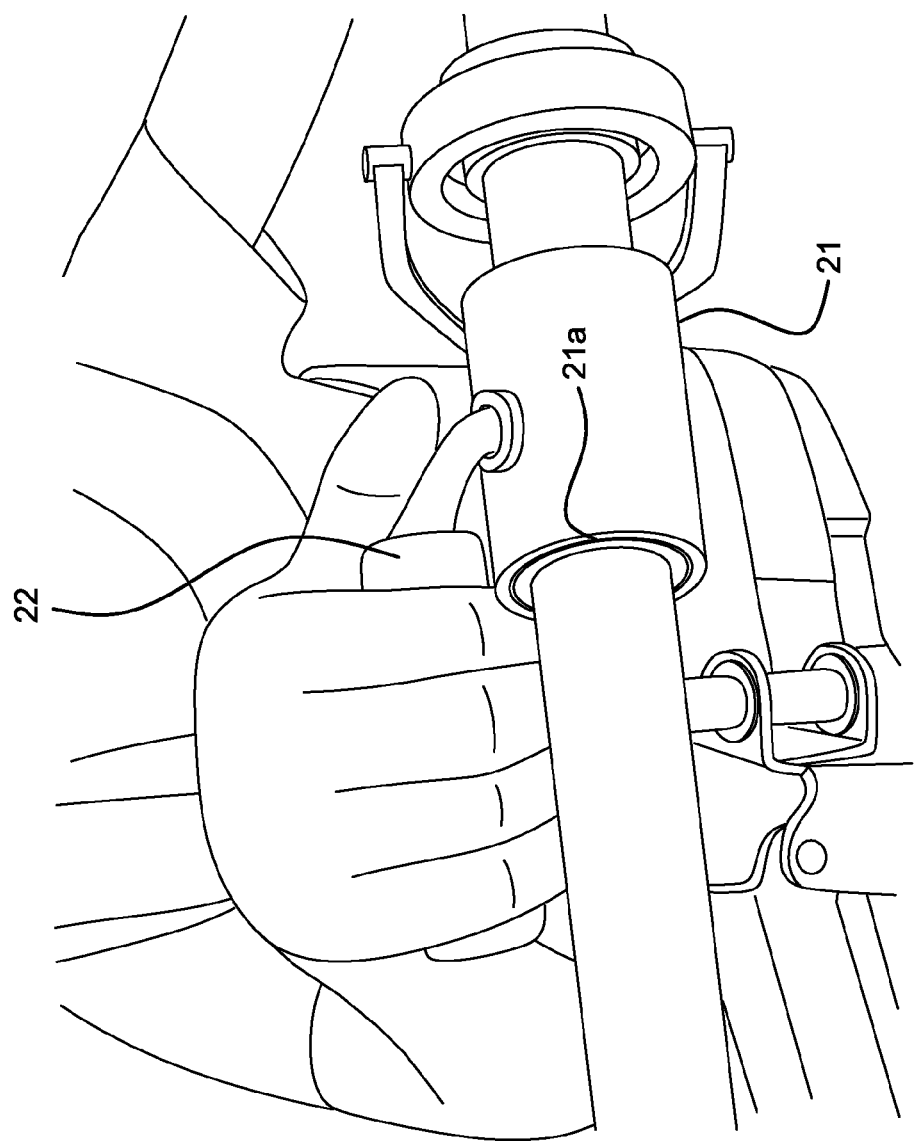
FIG. 14 shows an offset handgrip, hard-connected to an annular, axially isolated handgrip, for elevating and traversing an active balance pole according to an illustrative embodiment of the invention.

FIG. 14 shows another illustrative embodiment of annular, axially isolated handgrip 21, in which a handgrip 22 is offset from, and adjustably hard-connected to, handgrip 21 to enable an operator to more comfortably produce the motions and forces required to elevate and traverse active balance pole 18 without having to distort his handgrip position to accommodate momentary angles of handgrip 21. This embodiment also provides the angular axial isolation of grip 21 from pole 18 by means of annular bearings 21a or other suitable mechanism.

Figure 15:
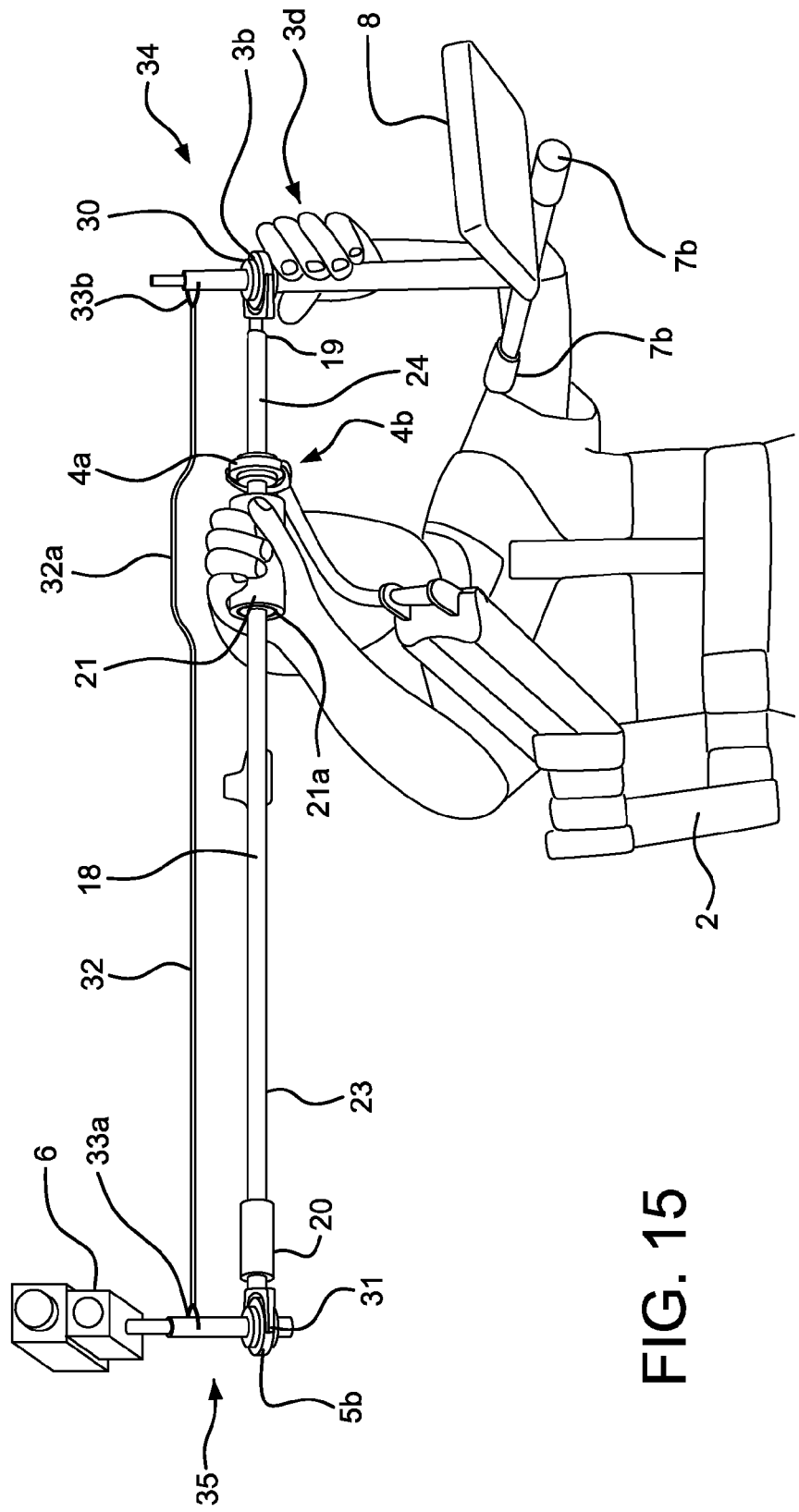
FIG. 15 shows another hard-connected lightweight embodiment with fewer counterweights and with a tie-rod interlocking a second axis of rotation according to an illustrative embodiment of the invention.

FIG. 15 shows another hard-connected lightweight embodiment employing versions of master sled 34 and slave sled 35, neither of which requires counterweights above or below its respective gimbals 3b and 5b because a second axis of rotation is hard-interconnected by means of tie-rod 32. Other connecting devices can also be used, such as pulleys and belts or lines, or interconnecting tie wires, for example. Therefore, slave sled 35 may carry only camera 6 above or below gimbal 5b. Master sled 34 may have a smaller counterweight, or no counterweight proportionally above or below gimbal 3b as required to balance the entire system as if all masses were deployed on a single virtual center post. As in the embodiment shown in FIG. 12, balance pole 4 and master and slave gimbal yokes 30 and 31 have a hard-interconnect to one axis of rotation of master sled 34 with respect to slave sled 35. Tie rod 32 is attached to pivoting yokes 33a, 33b at the slave and master sled ends of pole 18, respectively. The hard connection between the master sled end and the slave sled end by virtue of tie-rod 32 and yokes 33a, 33b facilitates transmitting the pivot angle of master sled 34 to slave sled 35. The yokes are attached to pan bearings to isolate the yokes rotationally from the center posts with which they are associated. Tie rod 32 can optionally comprise tie rod hand relief bend 32a to mitigate interference between tie rod 32 and the operator's hand, such as may occur for example at extreme pitch angles of operation. This also interlocks a second axis of rotation, so that master sled counterweights 7b and 8 can serve to balance camera 6 as if mounted directly above and below each other on a single virtual center post, suspended by a single virtual gimbal. The result is that angular control of master sled 34 by an operator at handgrip position 3d produces substantially identical rotations of camera 6 on slave sled 35. Neither sled 34 nor 35 is independently counterweighted to approximate neutral angular balance, but the interconnected combination of sleds 34, 35, balance pole 4, and pivoting yokes 30, 31 and 33 provide the same feel as if operating a conventional single-sled support device, such as a Steadicam®, yet with the additional freedom to achieve extra-high and extra low lens heights; and to extend horizontally as shown. Synchronization in the respective pan axes of master and slave sleds 34, 35 can be achieved by either sensor/motor means or by means of tie-rods and cranks (see FIG. 16) and/or belts, lines and pulleys or gears such as a sector gear.

Figure 16:
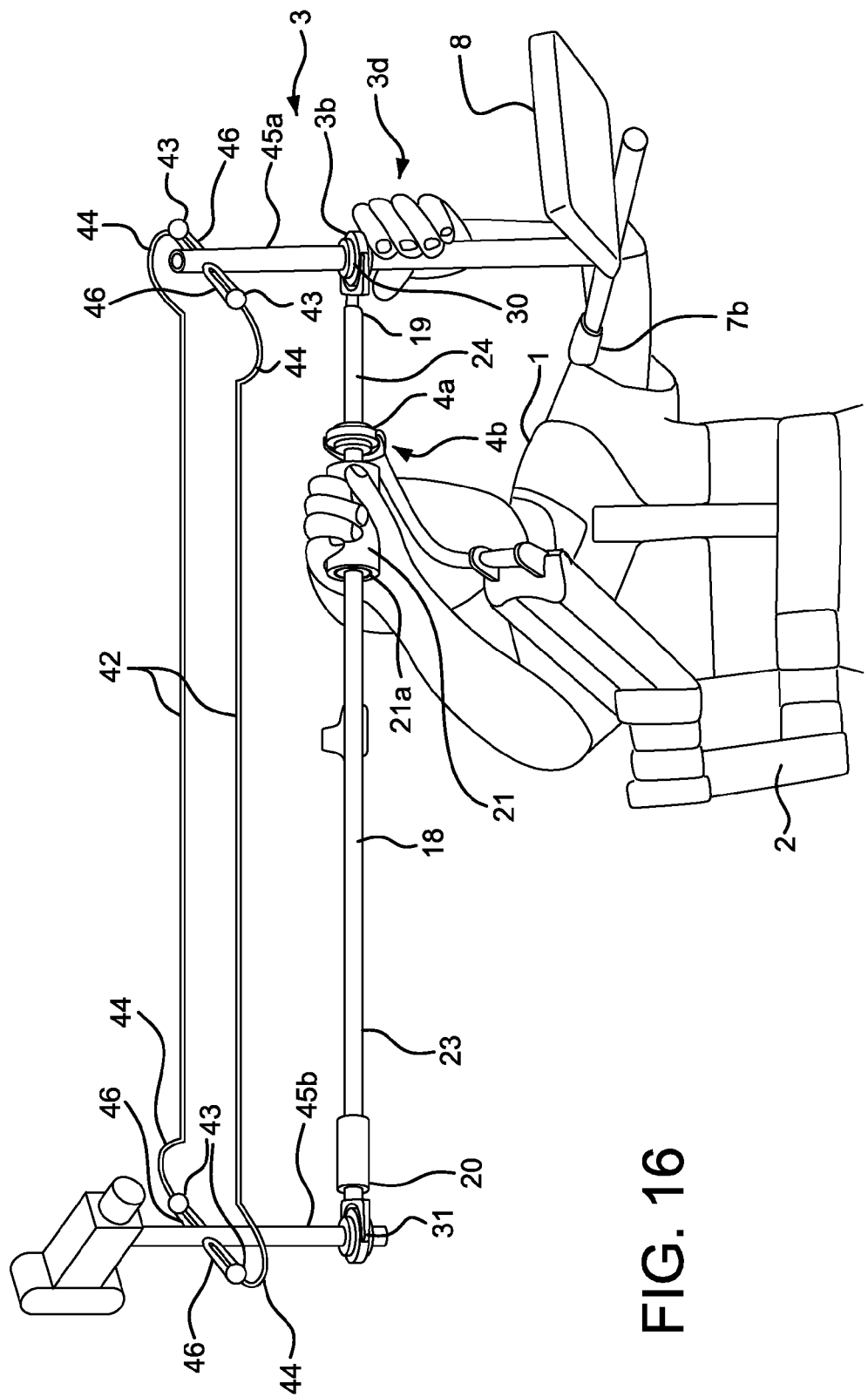
FIG. 16 depicts a support system in which a multi-part tie rod synchronizes both pitch motions and limited panning motions between master and slave sleds according to an illustrative embodiment of the invention.

FIG. 16 shows support system that does not necessarily require electronic servo motor connections in which a multi-part tie rod synchronizes both pitch motions and limited panning motions between master and slave sleds according to an illustrative embodiment of the invention. Tie rods 42 extend between tie rod universal joints 43 and thus, rigidly attach the extremities of tie rod struts 46 but remain angularly disconnected in two axes by means of tie rod universal joints 43. Tie rods 42 are therefore able to synchronize limited panning motions between master and slave sleds. Tie rod relief bends 44 can increase the angular range of panning motions by preventing early interference between tie rods 42 and extended master and slave center posts 45a,b.

Figure 17:
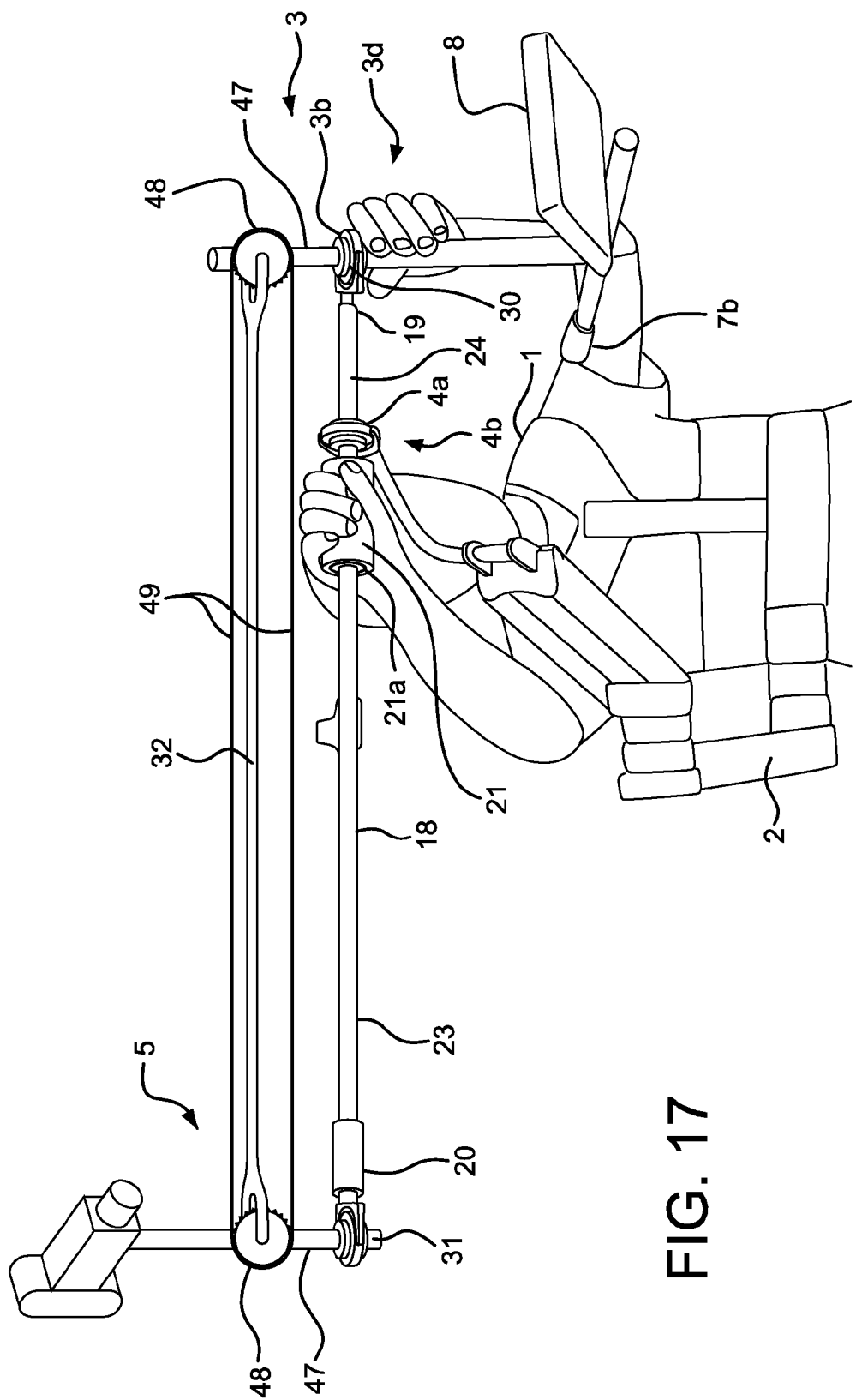
FIG. 17 depicts an illustrative embodiment of the invention which toothed gears and a belt operate in conjunction with a tie rod to synchronize both pitch and panning motions between master and slave sleds.

FIG. 17 illustrates another support structure that does not necessarily require electronic servo motor connections in which toothed gears and a belt operate in conjunction with a tie rod to synchronize both pitch and panning motions between master and slave sleds according to an illustrative embodiment of the invention. Toothed gears 48 and belt 49 operate in conjunction with tie rod 32 to synchronize both pitch and panning motions between master sled 3 and slave sled 5. Bevel-gear sets 50ab (shown in FIG. 18) intersect to transmit the panning motions applied to master sled 3 via belt 49 and gear wheels 48.

Figure 18:
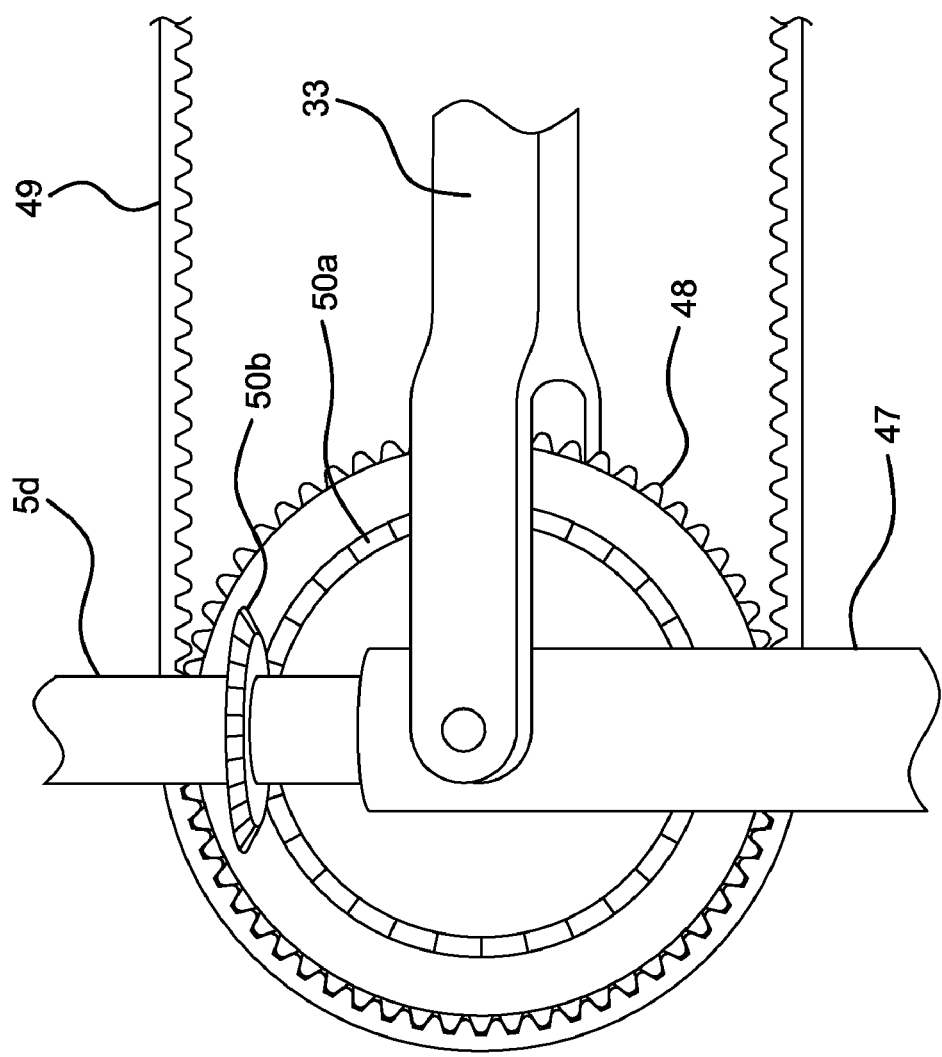
FIG. 18 provides further details of the embodiment depicted in FIG. 17, showing the mechanical interconnection between master and slave sleds by means of a gear belt and bevel-gears to effect the synchronization of panning motions.

FIG. 18 provides further detail of the illustrative embodiment of FIG. 17, showing the mechanical interconnection between master and slave sleds by a gear belt and bevel-gears to effect the synchronization of panning motions according to an illustrative embodiment of the invention. The slave end of the mechanical interconnection between master sled 3 and slave sled 5 includes a pan control gear belt 49 and bevel-gear set 50a and 50b which transmit and synchronize panning motions imparted to master sled 3 to slave sled center post 5d. Slave sled tie rod yoke (which is disposed around an end portion of tie rod 32) is pivotally attached to extended outer race tube 47 (which is disposed around a portion of slave center post 5d) and by means of tie rod 32 also synchronizes the pitch angle between slave sled 3 and master sled 5.

Figure 19:
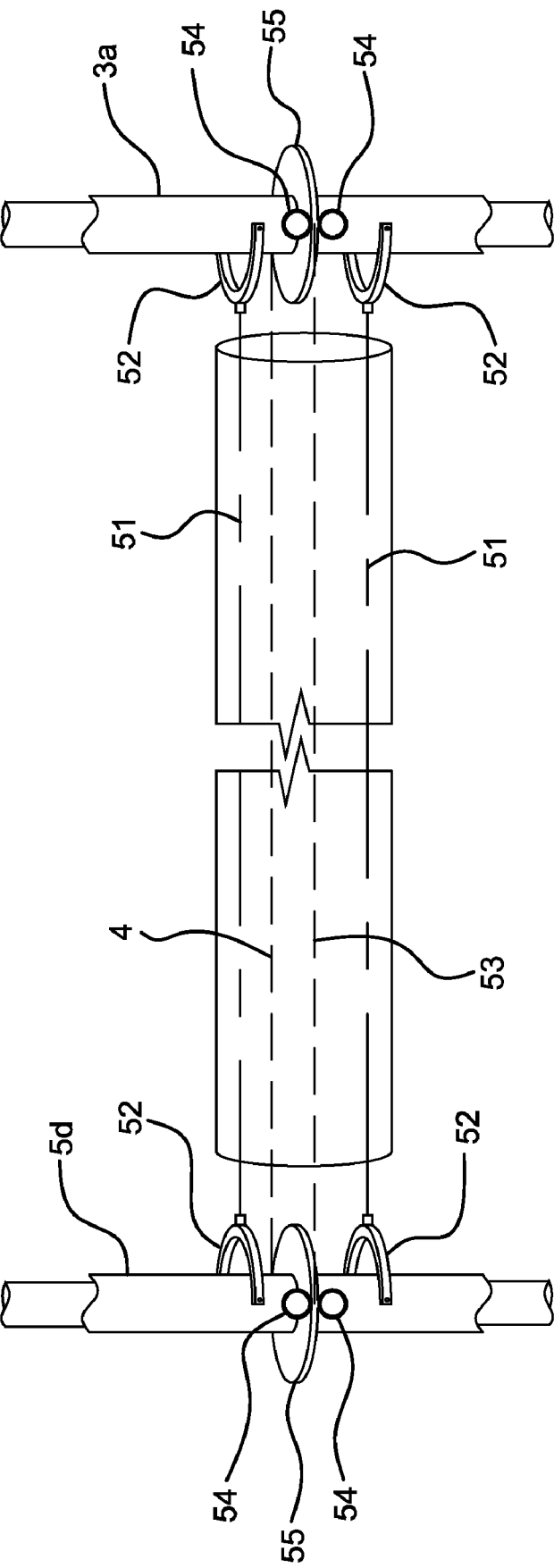
FIG. 19 depicts a support system with synchronizing components disposed within the balance pole according to an illustrative embodiment of the invention.

FIG. 19 diagrammatically depicts a support system with synchronizing components disposed within a balance pole according to an illustrative embodiment of the invention. Parallelogram tension cables 51a, b run substantially parallel to one another and longitudinally through the balance pole. They are pivotally connected by means of yokes 52 to each of the slave and master support sections so that movement of the master center post 3a is replicated at the slave center post 5d. Pan axes endless belt 53 extends between pan axes main drive gears 55 and guided onto gears 55 by means of belt idler gears 54. Belt 53 is preferably a 3-D toothed belt. Tension in wires 51 and belt 53 is to be maintained by the incompressibility of balance pole 4, which is attached by yoke 30 to master gimbal 3b and by yoke 31 to slave gimbal 5b. Note that for diagrammatic clarity, none of these is shown in FIG. 19.

Figure 20:
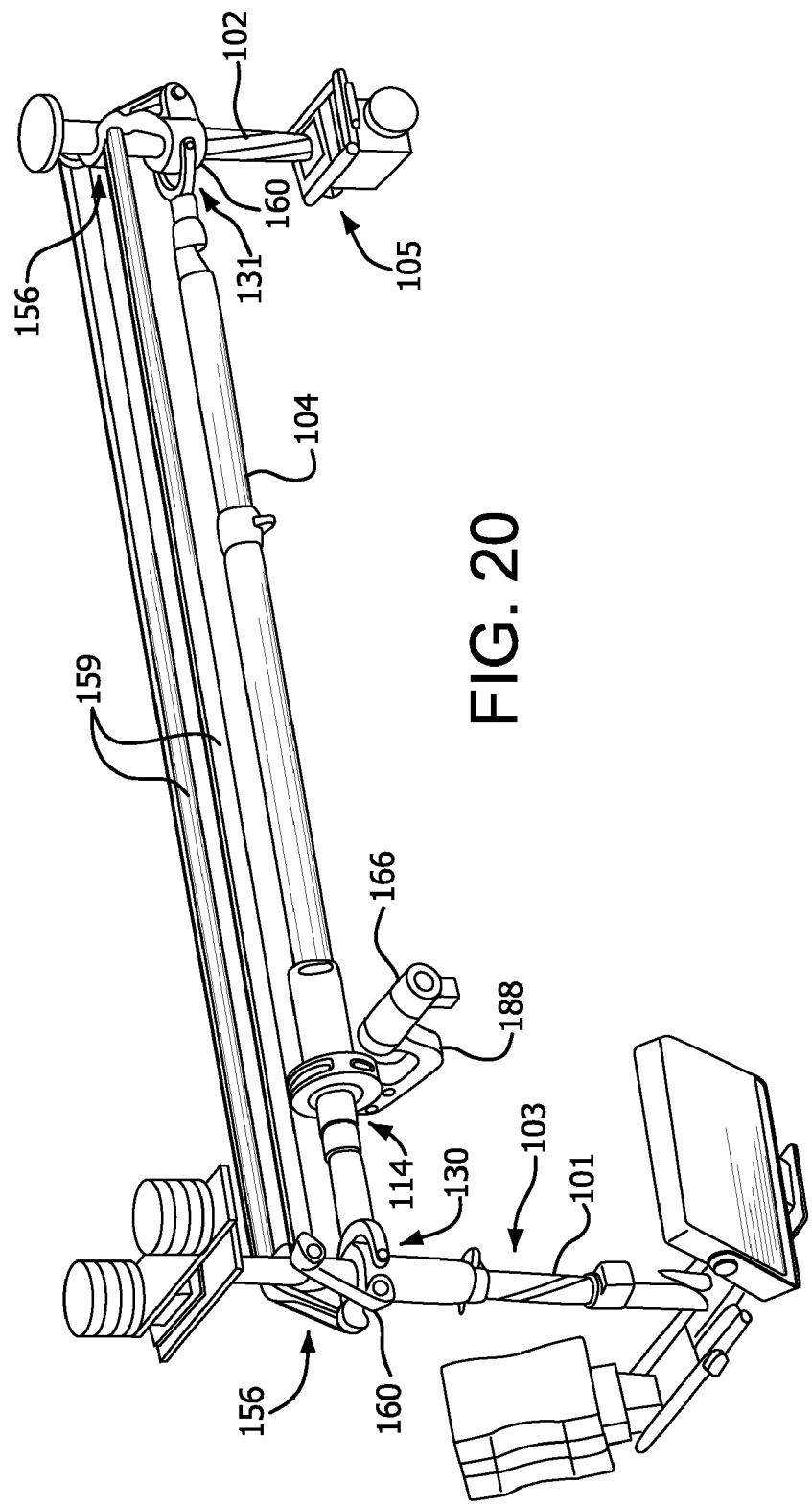
FIG. 20 is an isometric view of an extendable camera support and stabilization apparatus in which three axes of master gimbal motion are mechanically reproduced at the slave gimbal by means of tie rods, lines and pulleys according to an illustrative embodiment of the invention.

FIG. 20 is an isometric view of an extendable camera support and stabilization apparatus in which three axes of master gimbal motion are mechanically reproduced at the slave gimbal by means of tie rods, lines and pulleys, according to an illustrative embodiment of the invention. Balance pole 104 has attached to it at one end, master gimbal yoke 130, which is connected to master sled 103. The other end of pole 104 is attached to slave sled gimbal yoke 131, which is connected to slave sled 105. "Active" gimbal handle 166 is attached to tertiary active balance pole gimbal 114 via active handle offset 188 (shown in FIG. 24). Pulley trees 156 are attached to outer race housings 160 of the slave and master gimbals. The master end in this embodiment and other illustrative embodiments can be of the same configuration as the slave end of the apparatus.

Figure 21:
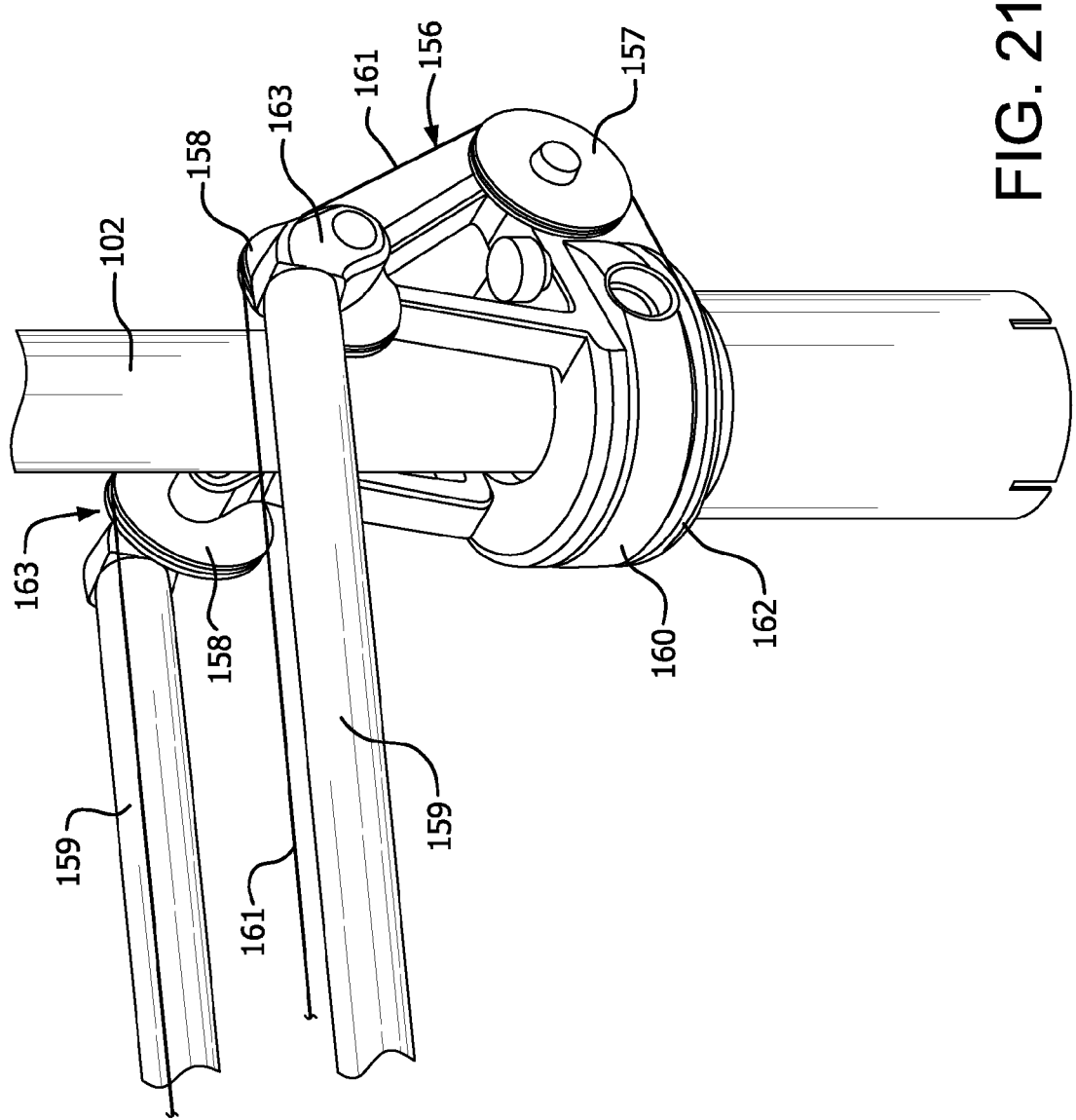
FIG. 21 is an isometric view of the slave end of an extendable camera support and stabilization apparatus detailing the arrangement of pulley tree, pivot pulleys, turning pulleys, main pan pulley and drive line in association with the outer race of the slave gimbal according to an illustrative embodiment of the invention.

The term "pulley tree" is used herein to designate a support bracket for various pulleys, of which some configurations are shown in FIGS. 20-23 and 26-28. Tie-rods 159 are attached to pulley trees 156 by tie-rod pivot ends 163 (such as shown in FIG. 21). Pulley trees 156 also provide mounts for pivot pulleys 158 and turning pulleys 157, which determine the path of pan control endless line 161 (see FIG. 21 for example). Pivot pulleys are those attached to the same pivots as the tie-rods. The pivot pulleys are attached to the outer race of the master of sled gimbals. The turning pulleys are also attached to the outer race of the slave and master gimbals. They accept endless line 161 from the main pulley and change its direction, such as by approximately 90°, as shown in the FIG. 21 embodiment. Collectively, tie-rods 159, pivot pulleys 158, turning pulleys 157, pan control line 161 and main pan pulleys 162 cause three axes of master gimbal angular motion to be mechanically reproduced at the slave gimbal.

Since tie rods 159 and balance pole 104 form the long legs, and the master and slave pulley trees 156 form the short legs of a functional parallelogram, tie rods 159 serve to keep the master center post 101 and slave center post 102 substantially parallel to one another. Tie rods 159 thus form the mechanical connection between master and slave sleds in the first of three axes of angular motion.

Balance pole 104 is hard connected to master and slave yokes 130 and 131, and thus forms the mechanical interconnection in a second axis of angular rotation.

A third axis of rotation is provided as follows: pan control drive line 161 engages and interconnects main pan pulleys 162 of the master and slave sleds by spanning the fixed parallelogram distances established by pulley trees 156 and their associated turning pulleys 157 and pivot pulleys 158. Drive line 161 runs along tie-rods 159 such that an active, one-to-one relationship is established between the pan-angle position of master sled 103 and that of slave sled 105, as if their respective main pan pulleys 162 were directly connected by pan control endless line 161.

Note that operators of camera support apparatuses, such as Steadicam® assemblies, typically have a preference for either 'left-handed' or 'right-handed' operation of their equipment. As detailed in FIG. 25, and described further below, active handle 166 is removably attached to the outer bearing race extension 168 (see FIG. 24) of gimbal 114 by means of removable pins 167, or other removable fastening device. This arrangement is advantageous for operating the extendable camera support and stabilizer, but it lacks the additional degree of rotational freedom typical with Steadicam®-type gimbals, so if the camera needs to be deployed on the opposite side from that shown here, active handle 166 must be remounted on the opposite side of gimbal 114 before the equipment is attached to an articulated support arm, with which it is typically used.

FIG. 21 is an isometric view of the slave end of an extendable camera support and stabilization apparatus showing an arrangement of pulley tree, pivot pulleys, turning pulleys, main pan pulley and drive line in association with the slave gimbal, according to an illustrative embodiment of the invention.

Pulley tree 156 is connected to slave gimbal outer race housing 160. Pulley tree 156 is further connected to tie-rods 159, pivot pulleys 158, turning pulleys 157 (one shown), main pan pulley 162 and pan control drive line 161. The aforementioned components together cause the respective pan angles of the slave sled center post 102 and master sled center post 101 (shown in FIG. 20) to be actively and synchronously connected. Slave gimbal yoke 131 and attached balance pole 104 form a leg of the parallelogram which synchronizes the angle of slave center post 102 with the master center post 101 (shown in FIG. 20).

Figure 22:
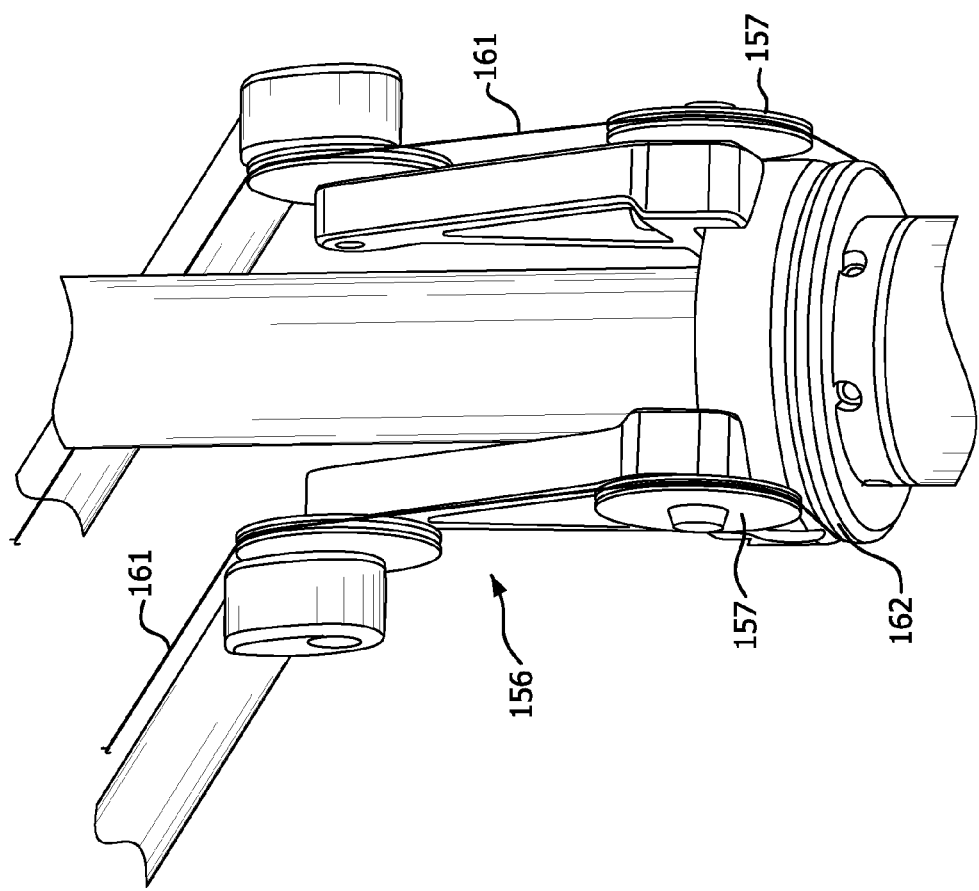
FIG. 22 is an isometric view of the slave end of an extendable camera support and stabilization apparatus showing the drive line position with respect to the turning pulleys and those of the main pan pulley according to an illustrative embodiment of the invention.

FIG. 22 is an isometric view of the slave end of an extendable camera support and stabilization apparatus showing the drive line 161 position with respect to the turning pulleys 157 and those of the main pan pulley 162 according to an illustrative embodiment of the invention. Pan control endless line 161 is disposed within flanges of turning pulleys 157 and main pan pulleys 162 and situated either tangentially to or partially around turning pulleys 157 and main pan pulleys 162. Note that this geometric relationship depends on the parallelogram relationship between tie-rods 159, balance pole 104 and yokes 130, 131 (shown in FIG. 20) and the respective master and slave end pulley trees 156.

Also note that as the "parallelogram" is elevated, the movement of line 161 with respect to pivot pulleys 158 at the slave end is substantially identically to its movement with respect to pivot pulleys at the master end, and the result is that elevating moves, raising and lowering the slave sled relative to the master sled, do not cause main pan pulleys 162 at either end of the parallelogram to alter either their absolute or relative angular positions. Therefore, such elevating moves, as synchronized by tie-rods 159, can be accomplished without effect on the camera pan axis.

Figure 23:
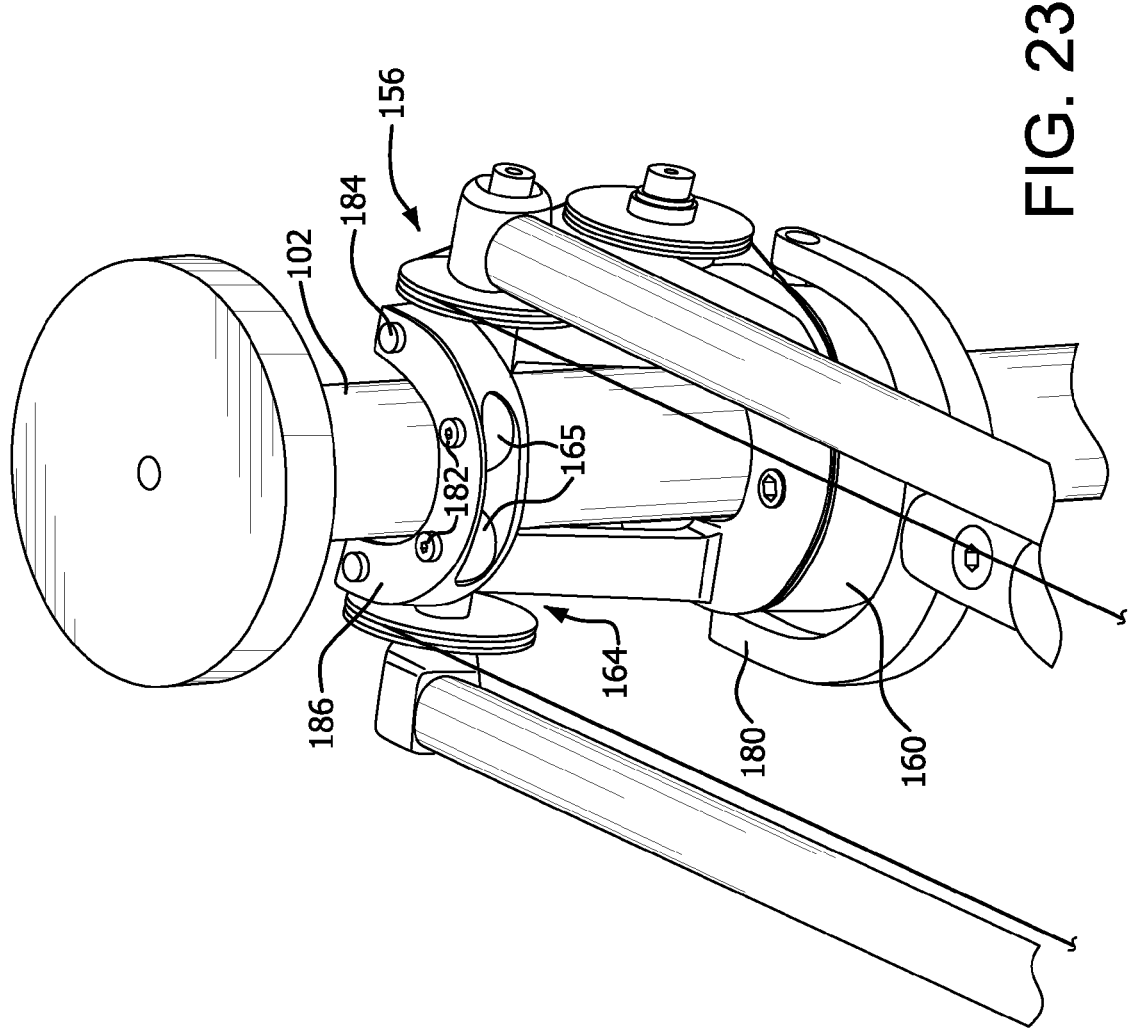
FIG. 23 is an isometric view of the slave gimbal pulley tree showing an optional idler roller assembly according to an illustrative embodiment of the invention.

FIG. 23 is an isometric view of the slave gimbal pulley tree showing an optional vibration control idler roller assembly according to an illustrative embodiment of the invention. Gimbal pulley tree 156 has idler roller assembly 164 attached thereto to dampen or eliminate vibration affecting central post 102, its respective outer race housing 160, and/or pulley tree 156. An analogous configuration can be present with respect to center post 101 at the master end of the apparatus. In the event of pan bearing play between center posts 101 or 102 and gimbal outer race housings 160, pulley trees 156, attached by attachment screw 180, will exhibit vibration with respect to the angular position of center post 102, for example from the vertical. Idler roller assembly 164 exerts unidirectional pressure on center post 102 and takes up the play in one direction. Idler rollers 165, rotating on idler roller axles 182 permit relative rotation of center post 102 and pulley tree 156 without vibration. Slots 184 are provided into which attachment screws are disposed. The slotted configuration allows idler roller assembly to be loosened and the position of mounting bracket 186 can be adjusted toward or away from center post 102 so that idler rollers 165 exert the desired amount of pressure on it to dampen or eliminate vibration.

Figure 24:
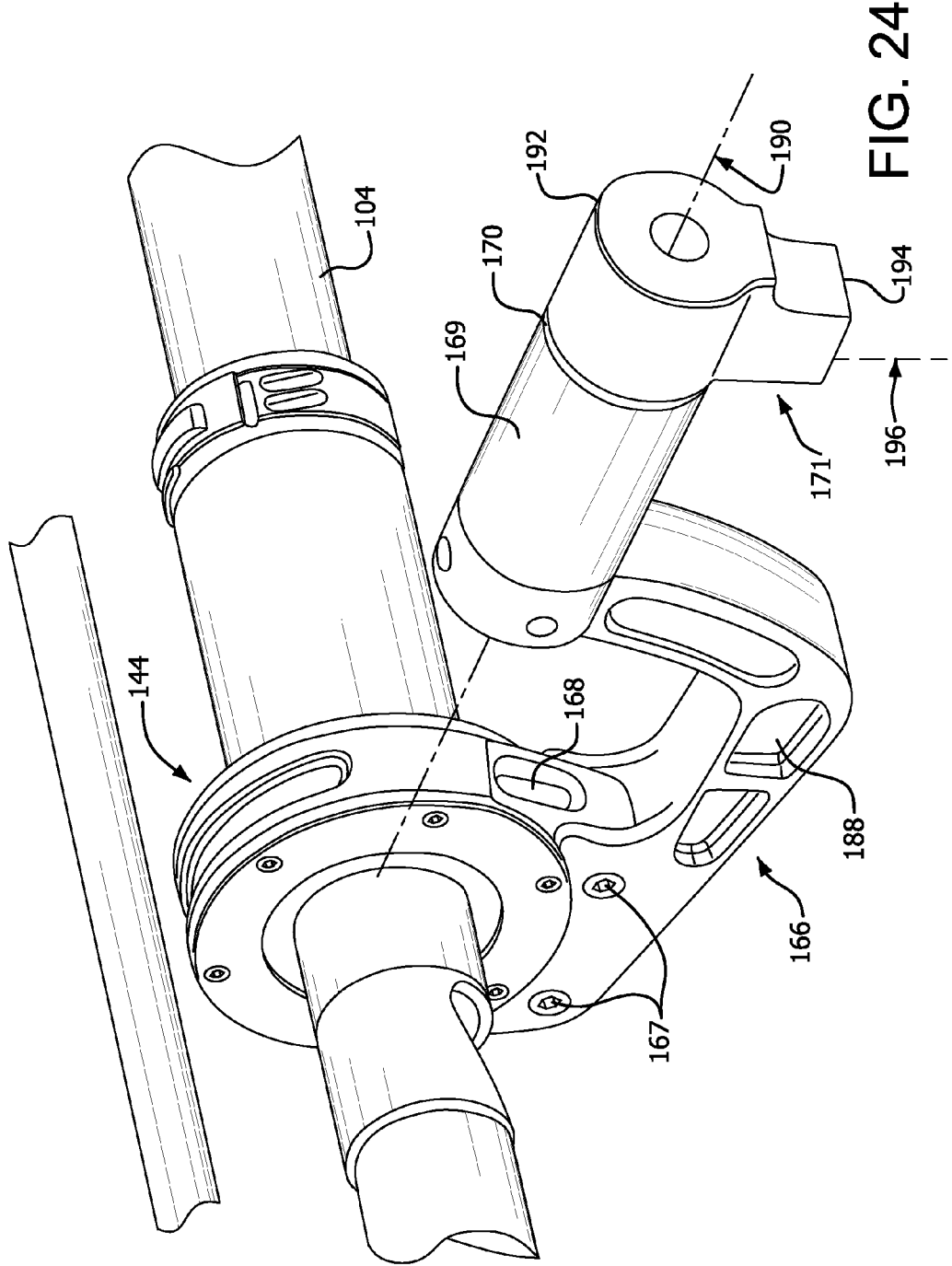
FIG. 24 is an isometric view of an 'active' gimbal handle according to an illustrative embodiment of the invention.

FIG. 24 is an isometric view of an 'active' gimbal handle assembly 166 according to an illustrative embodiment of the invention. The active gimbal handle facilitates both traverse and elevation control and arm positioning, allowing the other hand to only delicately control angle if necessary. The traverse motion, for example being a generally lateral sweeping motion of the entire apparatus, and the elevation, being generally a motion causing tilting of the balance pole. Outer race extension 168 of gimbal bearing 144 is attached, preferably by removable mounting pins 167, to active handle offset support bracket 188. Rotational engagement with active handle grip 169 by an operator's hand, plus pressure on offset support bracket 188, such as by finger and thumb, will directly cause active balance pole 104 to elevate around the centerline axis 190 of handle grip 169. Pivot bearings permit grip 169, separated by pivot gap 170 from arm post mount 171 to rotate around shaft 192. An articulated arm can be secured to gimbal handle assembly 166 via a post that preferably rotatably engages arm post socket 194 so that balance pole 104 can also be 'traversed' (rotated about axis 196 of the arm post) by means of pressure, such as by hand and finger/thumb on grip 169 and offset bracket 188, for example.

Figure 25:
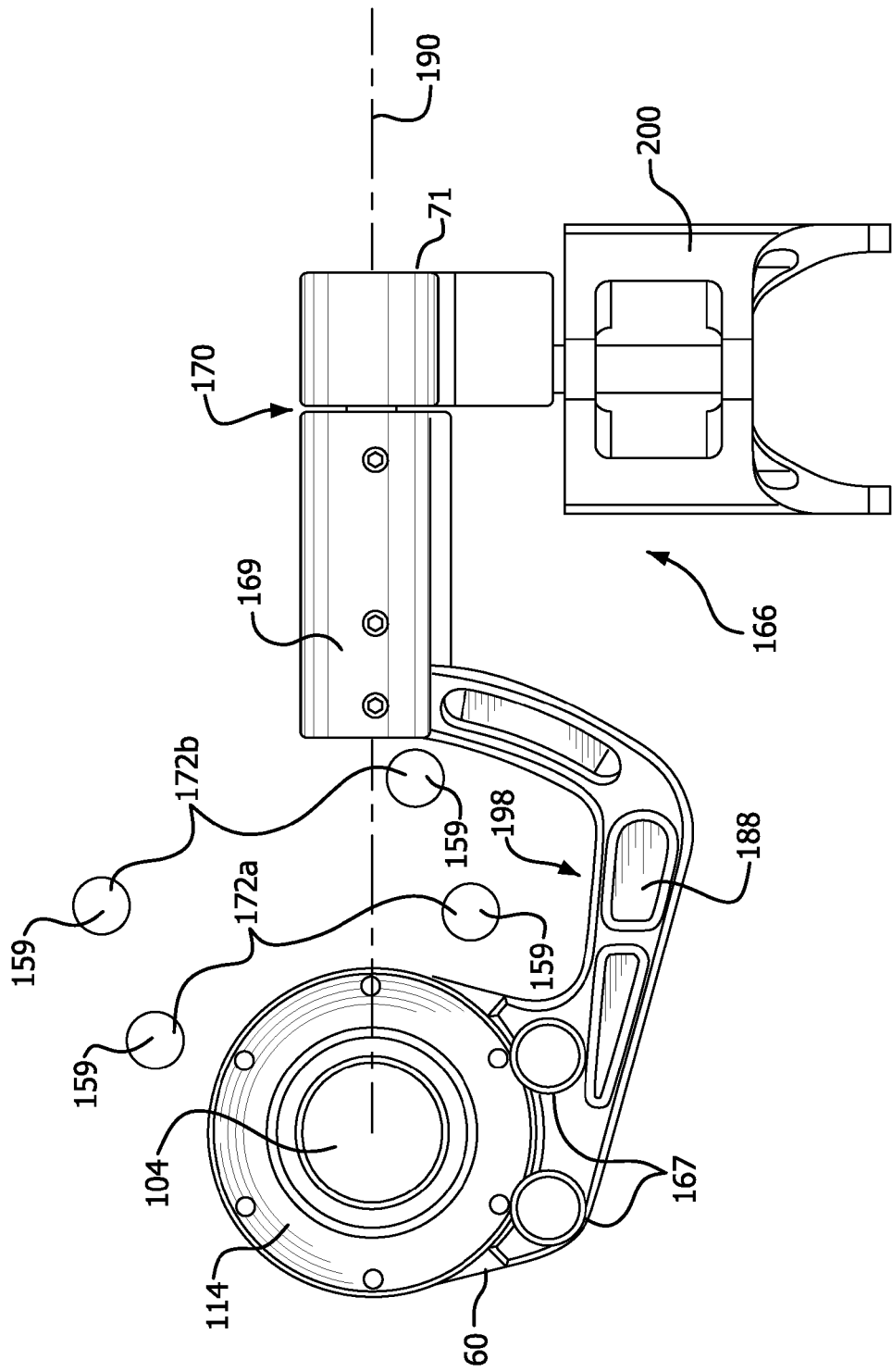
FIG. 25 is a side view of the active gimbal handle of FIG. 24 illustrating the function of a notch in the support bracket that accommodates tie rod incursions at various elevations during rotation of the balance according to an illustrative embodiment of the invention.

FIG. 25 is a side view of the active gimbal handle 166 of FIG. 24 illustrating the function of a notch 198 in the offset support bracket 188 that accommodates tie rods 159 incursions at various elevations during rotation of balance pole 104 according to an illustrative embodiment of the invention. Tie rods 159 are shown at two positions by reference numbers 172*a* and 172*b*. In this embodiment, notch 198 in offset support bracket 188 accommodates tie rod incursions throughout an approximate 80° rotation of active balance pole 104 around its longitudinal axis. This degree of rotation might be obtained in certain angular moves of the camera at the slave end—such as, at times, when tilted up 80°. Diagrammatic tie-rod positions 172*b* illustrate positions at one extreme of tie-rod separation from balance pole 104—such as would prevail if the balance pole was level and the respective master and slave center posts were vertical. Diagrammatic tie-rod pair positions 172*a* illustrates positions (and incursion into the notch 198 in offset of support bracket 188) at the opposite extreme—when balance pole was similarly rotated, but was elevated to an approximate 65° slant, with master and slave center posts still substantially vertical. It can be seen that tie-rod positions throughout these extremes of elevation and balance pole tilt remain comfortably within the notch 198 of offset in handle support bracket 188, and thus will not restrict, or reduce restriction of, these common operating maneuvers, such as would be required to take advantage of the spatial and angular agility of an extendable camera support and stabilization apparatus according to embodiments of the invention.

Further, pivot centerline 190 preferably precisely intersects the common centers of gimbal 114 and active balance pole 104, and thus will cause no elevating bias and so will remain at any elevational tilt set by hand-positioning grip 169. Traversing rotations of active balance pole 104 around arm post axis 196, are effected by rotating grip 169 about the axis. The axis coincides, for example, with an arm-mounting post on a support arm end block 200 by bearing means to effect rotation. The arm preferably being an articulated equipoising arm.

Note that, as disclosed in FIG. 20, active handle 166 is hard attached to outer race housing 160 by means of removable pins 167. Operators typically have a preference for 'left-handed' or 'right-handed' operation of Steadicam®-type assemblies. Steadicam® gimbals normally have an additional degree of rotational freedom, obtained here only by rotation about the arm post. The consequence is that handle 166 has a fixed angular relationship to balance pole 104, such that slave and master sleds cannot be easily swapped to the opposite side. (simply rotating the balance pole 180° about the handle pivot would cause both sleds to be upside down. Therefore, switching from, say, left-handed to right-handed operation is accomplished by 'docking' the entire extendable camera assembly, dismounting it from the arm, removing mounting pins 167, remounting handle 166 on the opposite side, and then picking the assembly up once again by means of the arm mounting post.

Figure 26:
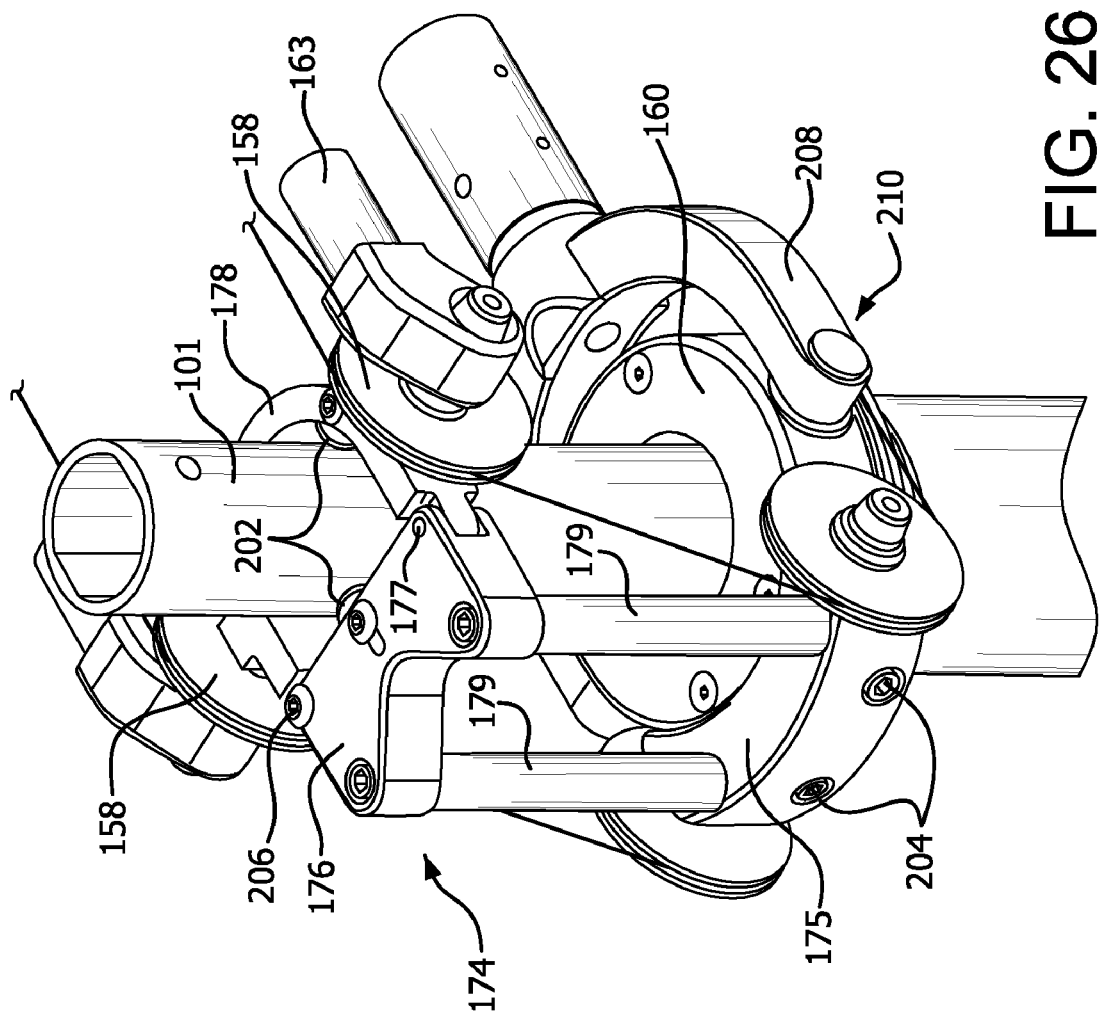
FIG. 26 is a perspective view of idler tree assembly including turning pulley bracket, standoff tubes, idler body with idler rollers, and idler body gate (in closed position) according to an illustrative embodiment of the invention.

FIG. 26 is a perspective view of a further illustrative embodiment of an optional vibration control idler tree assembly. Idler tree assembly 174 includes turning pulley bracket 175, standoff supports 179 (in this case tubes or solid cylindrical posts), idler body 178 with idler rollers 202, and idler body gate 176, shown here by example in its closed position, as associated with master sled gimbal 210. It is noted that the same or similar assembly can be employed at the slave sled end of the extendable support and stabilization apparatus. Generally the "idler tree" is a support system for various pulleys and vibrations damping components. The idler tree preferably attaches to the master of sled gimbal outer housing. Turning pulley bracket 175 is attached to gimbal outer race 160, such as by mounting screws 204 and forms a base for idler tree assembly 174. Standoff supports 179 support idler tree gate 176, which is hinged at idler body gate hinge 177. Idler tree gate hinge locking screw 206 secures idler body gate 176 in the closed position, thereby positioning idler body 178 against central post 101. Idler tree assembly 174, thus can position pivot pulleys 158 and tie rod pivot ends 163 exactly to either side of the vertical center-line of center post 101, and maintain the selected distance above gimbal yoke pivot 208.

Idler tree assembly 174 includes a plurality of idler rollers 202 (two of three visible in this example) that directly or indirectly contact center post 101 while permitting its free rotation and controlling the axial position of center post 101 with respect to pivot pulleys 158 and tie rod pivot ends 163. Thus, vibration between center post 101 and tie-rod pivot ends 163 and tie-rods 159 caused, for example by bearing play, such as in master gimbal 210, is reduced or eliminated.

Use of the idler roller assembly shown in FIG. 23 can also diminish this vibration by forcing the orientation of the associated center post to one extremity of the available pan-bearing play, but might cause additional friction since the bearing is not permitted to hang in its normal centered, pre-loaded condition. Use of idler tree assembly 174 of this illustrative embodiment can lightly fix the angle of the associated centerpost (101 in this figure) with reference to the tie rod ends and permit it to maintain a substantially centered, preloaded orientation.

Figure 27:
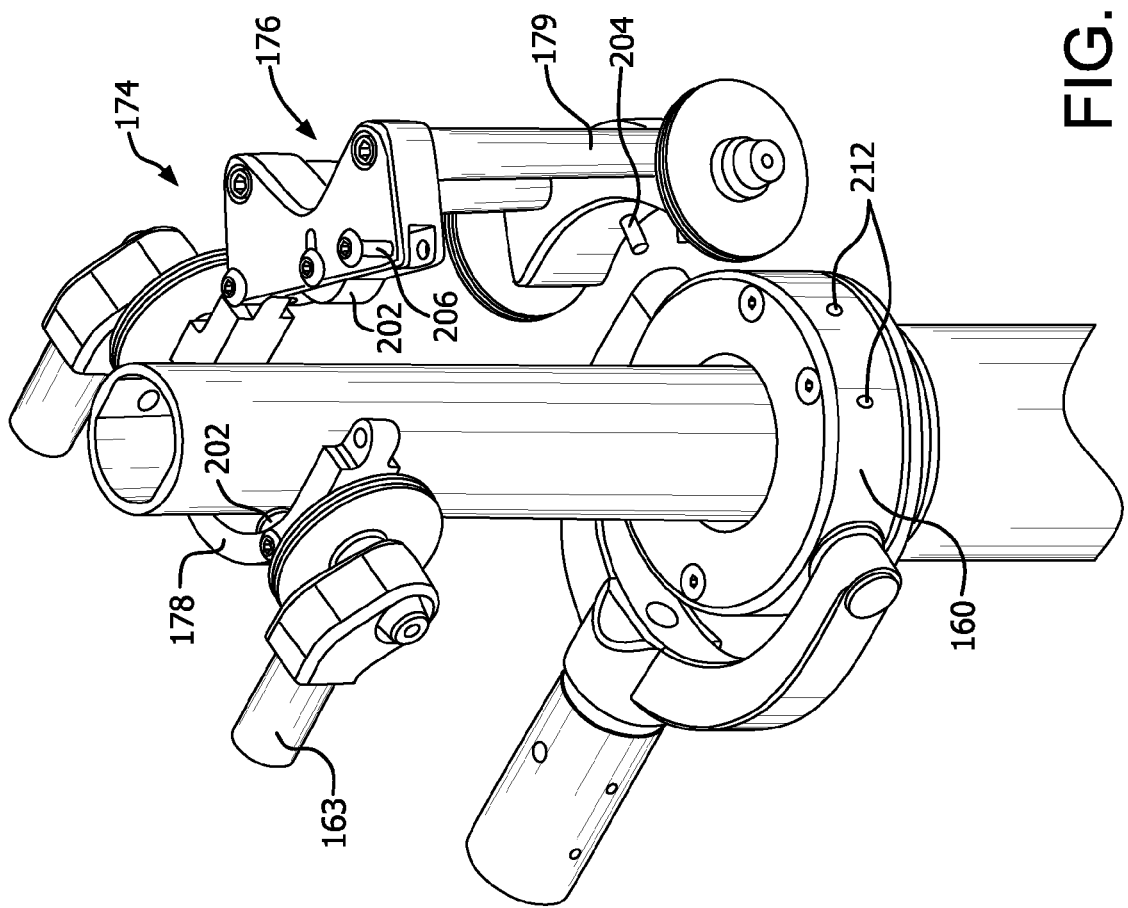
FIG. 27 is an opposite perspective view of idler tree assembly including turning pulley bracket, standoff tubes, idler body with idler rollers, and idler body gate in the open position for mounting and dismounting to the gimbal outer race housing according to an illustrative embodiment of the invention.

FIG. 27 is an opposite perspective view of idler tree assembly 174 shown with gate 176 in an open position according to an illustrative embodiment of the invention. With gate 176 open, idler tree assembly 174 can be removed. Gate 176 can be rotated about hinge 177 by first withdrawing hinge locking screw 206 and gate hinge locking screws 204. Gate hinge locking screws 204 are inserted in tapped holes 212 to secure idler tree assembly 174 to gimbal outer race housing 160 when apparatus is in an operative position. As can be seen from FIG. 27, idler tree assembly 174 can be entirely removed, for example to facilitate packing and shipping.

Figure 28:
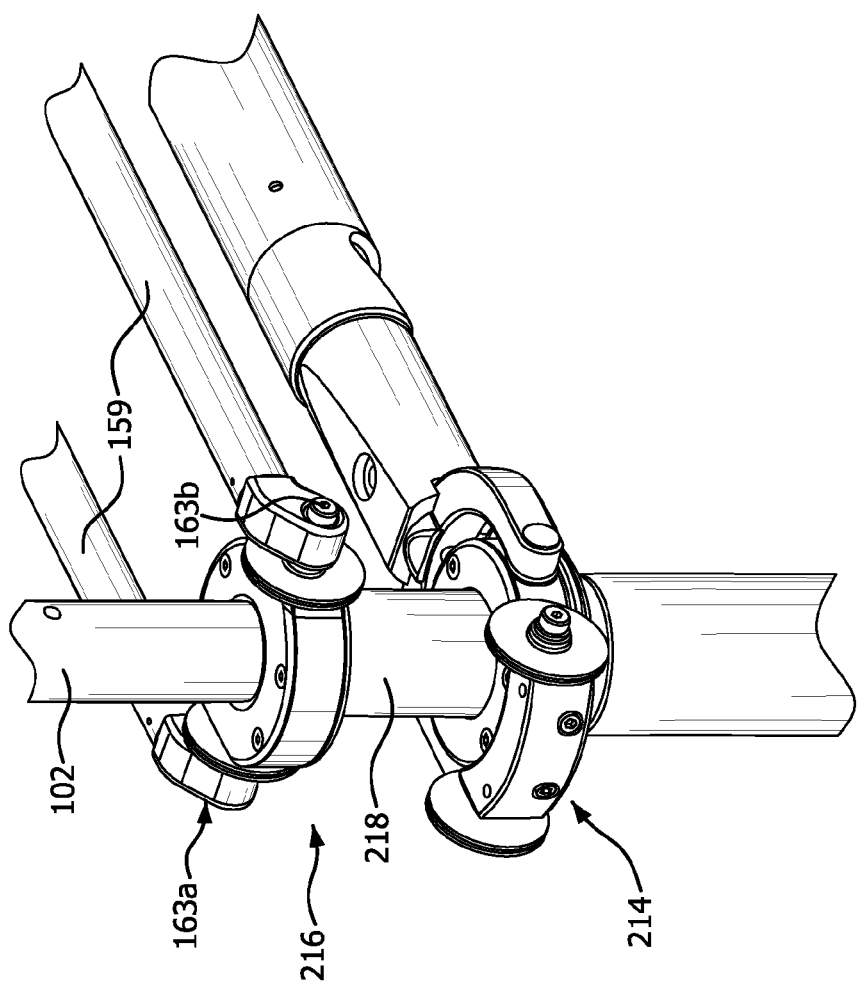
FIG. 28 is an isolated perspective view of the tertiary balance pole gimbal outer race with narrow extensions, attached resilient pads and bored hole for pivot axle.

FIG. 28 depicts a further illustrative embodiment of the invention that may reduce or eliminate vibration related to movement of a center post with respect to the gimbal. In this embodiment, a second gimbal 216 is disposed around center post 101 and/or 102 above gimbal 210 or 214, respectively. Preferably both lower and upper gimbals are connected to a common inner race 218, thus setting the distance between upper gimbal 216 with respect to lower gimbal 210, and maintaining a consistent parallelogram structure. If two tie rods 159 are included in the extendable support and stabilization apparatus, the first tie rod can be connected to a first gimbal yoke pivot 163*a* and the second tie rod can be connected to a second gimbal yoke pivot 163*b* opposite the first gimbal yoke pivot 163*a*. In an alternative embodiment of the invention, a single tie rod is connected to the yoke in an analogous manner to the connection between the lower gimbal yoke and the balance pole. The pan control endless line can be disposed around the main pan pulley at the lower gimbal or around an analogous pulley associated with the inner race tube between the upper and lower gimbals. Various pulley arrangements can achieve the desired replication of motion between the slave sled and the master sled, and are within the scope of the invention.

Existing Steadicam®-type systems can be adapted or retrofitted with the various pulley and tie rod systems described herein, including the vibration control devices. For example, the inner race of a gimbal disposed around a center post can be grooved to accommodate a pulley line and serve as a main pan pulley, or the existing inner race can be replaced with a grooved inner race for that purpose. A pulley tree with various pulleys such as pivot and turning pulleys can be added.

Figure 29:
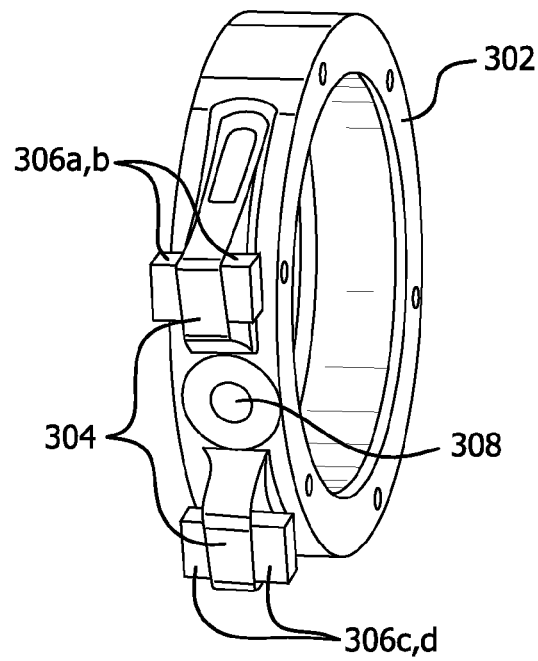
FIG. 29 depicts an outer race of a gimbal assembly for an active handle according to an illustrative embodiment of the invention.
Figure 30:
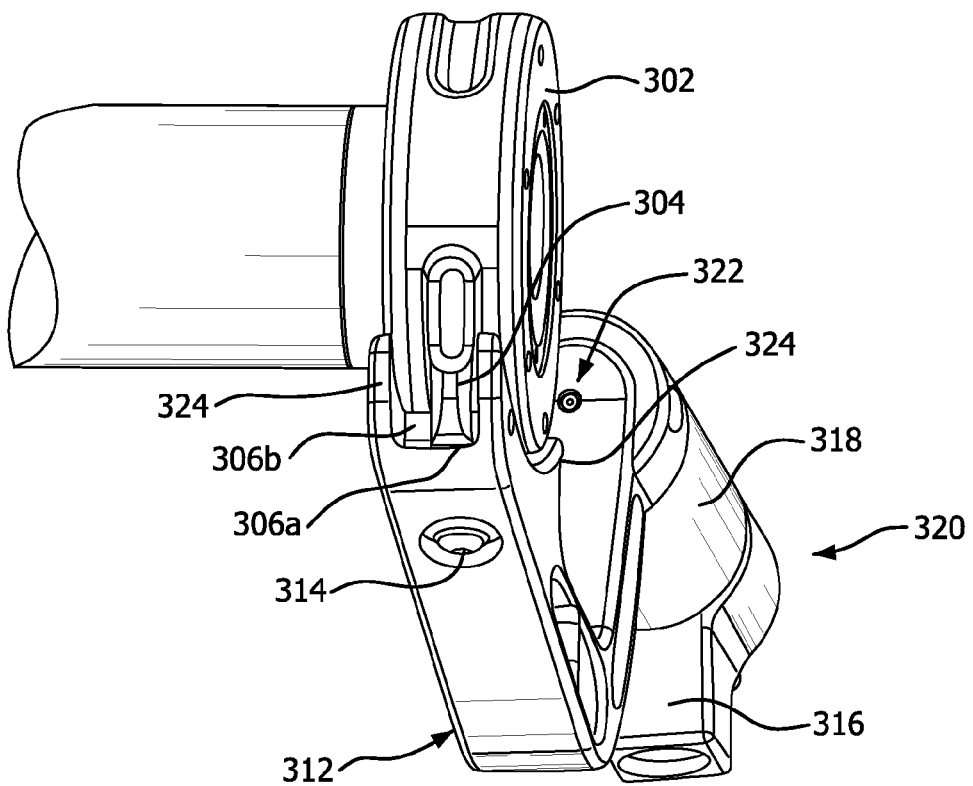
FIG. 30 is a perspective view showing the outer race of FIG. 29 operatively associated with active handle support bracket and pivot axle, the assembly in an angularly deflected position with one resilient pad shown compressed.

FIG. 29 is an isolated perspective view of tertiary gimbal outer race 302 with outer race extensions 304, attached resilient pads 306a, b, c, d and bored hole 308 for pivot axle (shown in FIG. 30). The tertiary gimbal out race may be disposed around a balance pole or a sleeve disposed around the balance pole.

FIG. 30 is a perspective view showing tertiary balance pole gimbal outer race 302 of FIG. 29 operatively associated with active handle support bracket assembly 312 and swiveled about pivot axle 314 into an angularly deflected position with respect to support bracket 312 such that one resilient pad 306a is compressed against support bracket flange 324, thus limiting the possible angular excursion therebetween. Opposing resilient pad 306b is in a non-compressed state. Preferably, the excursion is limited to approximately ±10°. As a result of this resilient damping, minute, unwanted angular motions imparted to arm post mount 316 by the mass-in-motion of the support arm segments (not shown) will not be transmitted to outer race 302, and thus to a balance pole disposed through it and any associated equipment, such as cameras. Deliberate gross angular inputs imparted by motions of grip 318, however will result in appropriate elevations and traverses of the balance pole.

Figure 31:
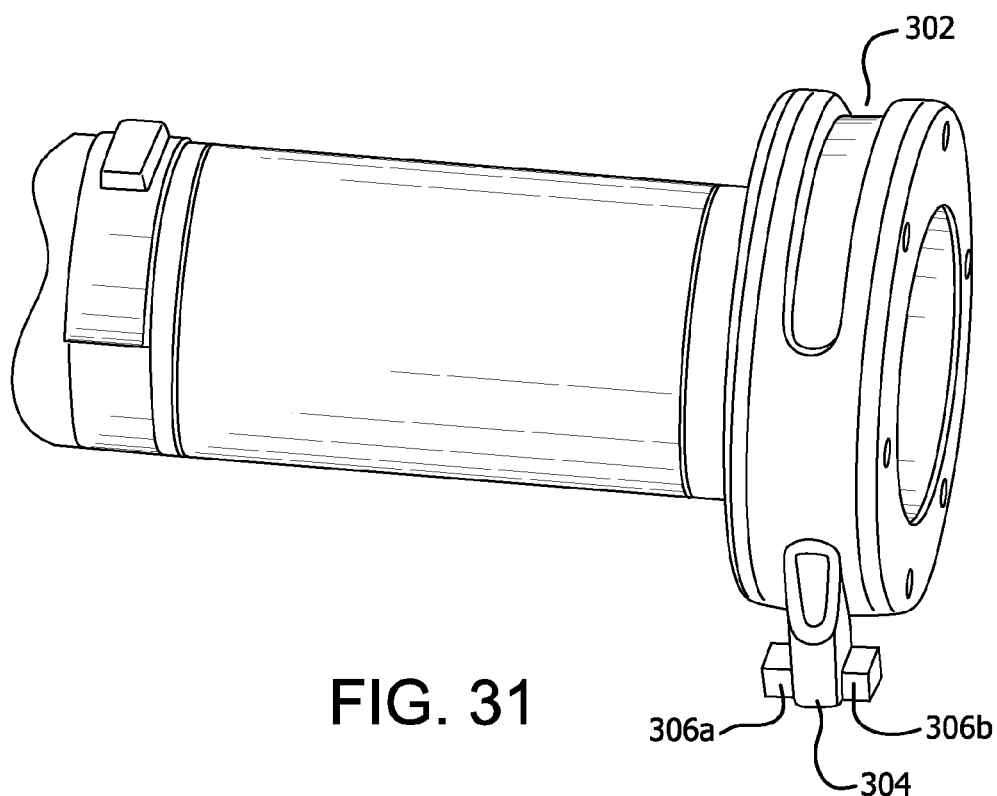
FIG. 31 and FIG. 32 are exploded views, respectively of the outer race and support bracket assembly of FIG. 30 showing one of the outer race extensions with associated resilient pads, and the support bracket showing the pivot axle and bearing assembly that will engage the bore-hole in the outer race.
Figure 32:
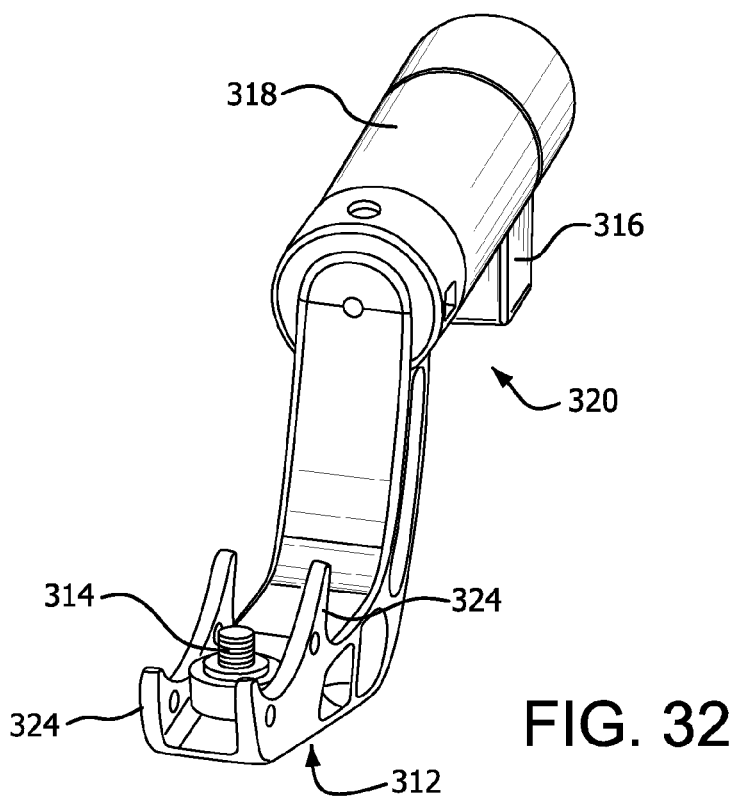

FIG. 31 and FIG. 32 depict outer race 302 and support bracket assembly 312 of FIG. 30. FIG. 31 shows one of outer race extensions 304 with associated resilient pads 306. Offset support bracket assembly 312 is shown in FIG. 32 including pivot axle 314 and a bearing assembly that will engage borehole 308 (shown in FIG. 29) in outer race 302.

Figure 33:
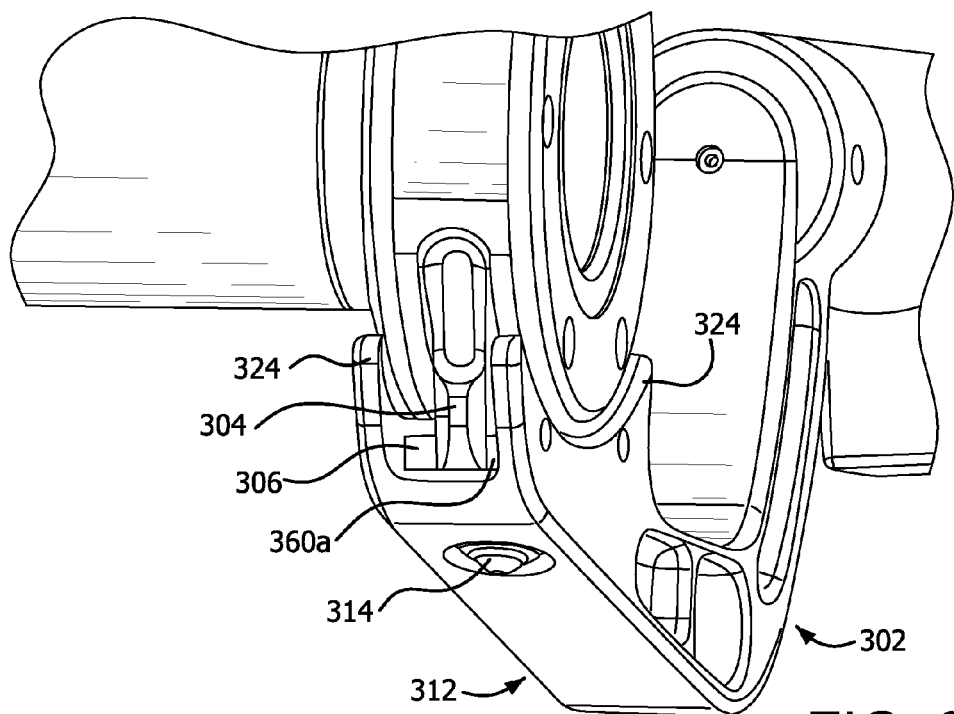
FIG. 33 and FIG. 34 show close up perspective views of the active handle assembly with the outer race pivoted to compress the resilient pad against the walls of the support bracket.
Figure 34:
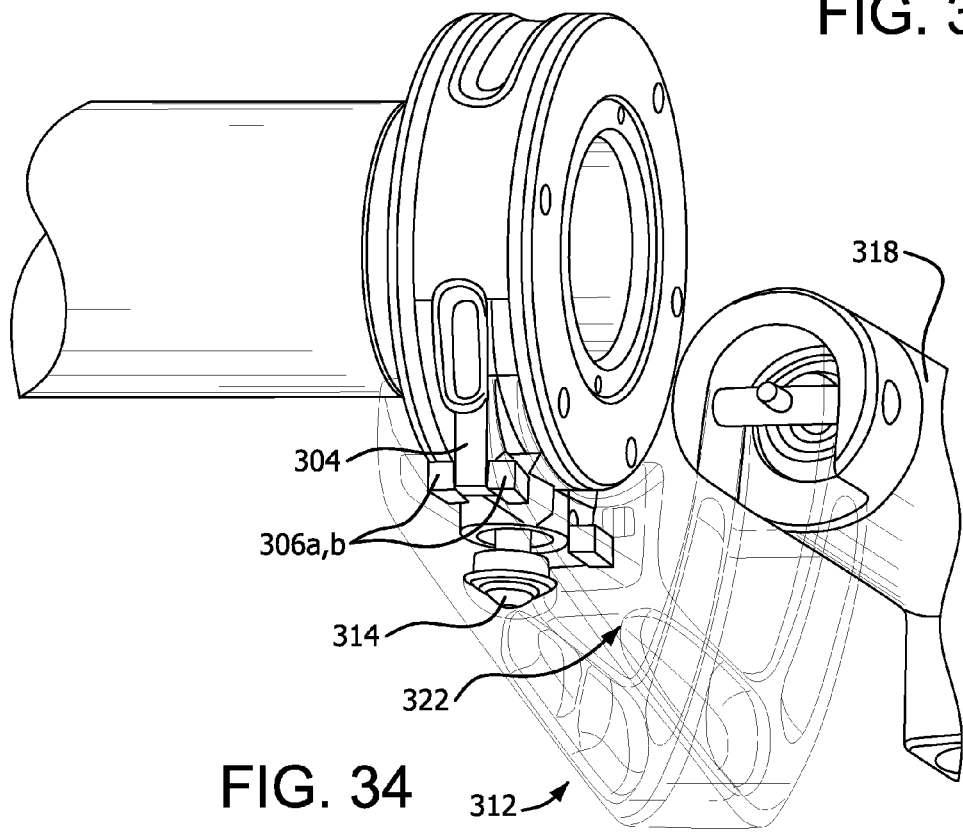

FIG. 33 and FIG. 34 show perspective views of active handle assembly 320 with outer race 302 pivoted to compress resilient pad 306a against flange extensions 324 of offset support bracket assembly 312, thus limiting the angular excursion of outer race 302 with respect to flange extensions 324. In FIG. 34, offset support bracket assembly 312 is rendered transparently to illustrate its relationship to resilient pads 306a,b, outer race extensions 304 and pivot axle 314 and associated bearings assembly. Active gimbal handle 320 is similar to active gimbal handle 166 shown in FIG. 24 and FIG. 25, except handle 320 is provided with additional angular isolation from small unintentional motions imparted to arm post socket 316. Gross intentional angular motions imparted to grip 318 are closely and smoothly replicated by corresponding angular motions transmitted to outer race 302. However, unintentional, small, angular motions imparted to active gimbal handle 320 are dampened and averaged out by the isolating action of pivot 314 and resilient bumpers 306 contained within support bracket flanges 324.

Like active gimbal handle 166, active gimbal handle 320 includes an offset support bracket assembly 312, having a notched area 322 to accommodate tie rods.

Figure 35:
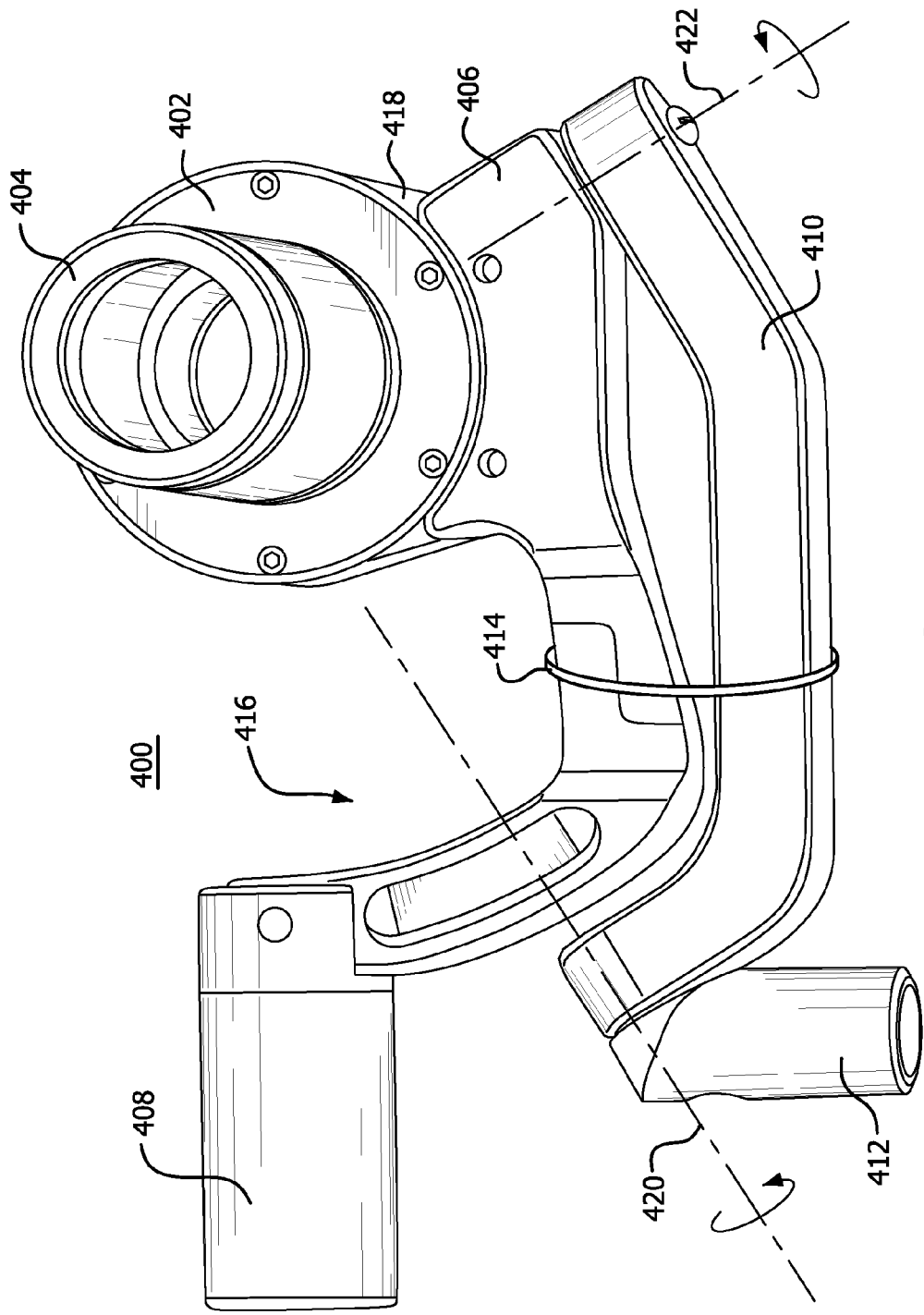
FIG. 35 depicts a handle assembly according to an illustrative embodiment of the invention.

FIG. 35 depicts a handle assembly 400 according to an illustrative embodiment of the invention. Handle assembly 400 includes a gimbal assembly having an outer race 402 and an inner race (not shown), associated balance pole sleeve 404, through which a balance pole can be disposed. As used herein, "outer race" refers to all parts rotating with the outer race of a bearing. Balance pole sleeve 404 is fixedly attached to the inner race, thus rotatably attached to the outer race. The handle assembly is configured to be functionally connected to, and longitudinally slidably disposed on, the balance pole. The gimbal outer race 402 is fixedly attached to a handle support bracket 406 toward a proximate end of the handle support bracket. This attachment is preferably substantially without movement. Handle support bracket 406 can be attached to outer race 402 via an extension such as partially shown as part 418. The handle support bracket 406 is further attached to a handle grip 408. An arm mount bracket 410 having distal and proximate ends is rotatably attached at its proximate end to handle support bracket 406 toward a proximate end of handle support bracket 406. An arm mount 412 is rotatably attached to arm mount bracket 410 distal end. A resilient component 414 is functionally arranged with respect to arm mount bracket 410 and handle support bracket 406 to limit rotation of the brackets with respect to one another and to dampen associated motion. Resilient component 414 is shown as an elastic band but can be various others types of components, such as a spring-based mechanism or rubber-based travel restraining bumpers. Generally, the rotation between arm mount bracket 410 and handle support bracket 406 should be limited to approximately ±20°. Mechanisms that limit rotation to that amount or the desired amount for the application, and which eliminate or dampen hard stops at the extremes of motion are suitable. The mechanisms should also not interfere with tie rods that may need to enter into notch 416. Illustrative ranges of rotation between arm mount bracket 410 and handle support bracket 406 include about ±30°; and about ±30°. Generally the range will be approximately evenly split on each side of the bracket.

The illustrative design shown in FIG. 35 has two perpendicular axes 420, 422 of gimbal swivel, which converge at the approximate center of the balance pole. A balance pole would be situated, for example, within the "clamp-tube" (balance pole sleeve) shown.

The invention also includes methods of using and making the devices described herein.

Various embodiments of the invention have been described, each having a different combination of elements. The invention is not limited to the specific embodiments disclosed, and may include different combinations of the elements disclosed.

Some or all of the following attributes may be present in embodiments of the invention in addition to or in place of any other features described herein:
  a simple, inexpensive, compact body- or vehicle-supported mount for lightweight cameras that can be extended at a distance from the operator in any direction and reach lens-heights from 'floor to ceiling', without undue exertion and with intuitive, accurate, local, three-axis angular control over the extended camera;
  extended reach and angular agility so that stabilized shots can be made that preferably include unrestricted and intuitive angular control of the camera, as well as large lateral and vertical displacements from the operator's position;
  continuous vertical range of motion in a body-mounted camera stabilizing devices, with the elimination of low-mode brackets, low-mode conversions;
  a multi-sectional telescoping post, which can be elongated to facilitate high lens-heights and, extra-low lens heights in 'low mode, without the angular inertia in the 'tilt' axis becoming disproportionately large compared with the unchanged angular inertia in the 'pan' axis to provide a less cumbersome device to operate and which remains angularly agile as well as stabilized;

a structurally simple and electronically uncomplicated improvement in the functionality and angular agility of body-mounted 'roll-cage' camera stabilizing devices, which does not require expensive, level-sensing, gyro-and-pendulum integrating computers to preserve the level attitude of the camera;

three-axis angular control of a remotely positioned camera head without having to elevate or traverse a long sled center post;

improved angular agility as compared to conventional pole-mounted camera supports, so that they can be remotely panned and tilted (and rolled) with intuitive precision, rather than controlled by means of awkward and non-intuitive 'joysticks,' which do not inherently 'back-pan';

improved angular stability as compared to conventional pole-mounted camera supports, so that they can provide level and stable shots even during violent dynamic motion, and still facilitate precision operator control;

improved angular control as compared to conventional extended pole-mounted camera supports, so that they automatically 'back-pan' (meaning that as the pole traverses horizontally or 'booms' vertically, the camera's angular attitude is not correspondingly altered, and is therefore much easier to consistently and precisely 'aim' at a distant subject;

a 'pole-mounted' camera that can selectively pan and tilt more than 360° without seeing its own local supporting structures within the shot.

a support system for extremely light camera chip/lens combinations, such as, for example, those weighing less than one pound, which can still be stabilized by the angular inertia of a larger, heavier structure;

a camera support and operational system that provides extremely low and high lens positions, but does not require protracted bodily exertions to accomplish these shots;

a support system having fully-isolated inertial stability, but adapted to servo-control a one-to-one 'master/slave' relationship between the momentary angular attitude of a master sled (optionally without a camera) and that of a miniature slave sled, with attached lightweight camera, mounted, respectively, at the extreme ends of an intervening, extended balance pole;

remote facilitation of angular and spatial control of lightweight video cameras by means that are stable and repeatable and do not add additional angular inertia at extreme high/low elevations or lateral extensions;

a continuous 'boom' range (range of dynamic vertical motion) that permits the lens to elevate from 'floor to ceiling' at will, and traverse horizontally without applying any angular disturbance to the master sled;

the momentary dynamic tri-axial relationship of the master sled center post to the attached balance pole reproduced approximately one-for-one at the other end with respect to the center post of the slave sled and its associated camera, so that its angular relationship to the longer lightweight end of the balance pole continuously mimics that of the master sled to the shorter, heavy end of the pole;

primary view finding of the image generated by the camera on the slave sled, via a conventionally positioned monitor on the master sled;

secondary view finding by means of an additional monitor, which acts as counterweight for the slave sled and a way to view the image when the operator's attention must be concentrated on the proximity of the slave sled to any obstacles;

a small, compact camera head that can penetrate small openings, yet preserve locally independent pan/tilt/roll capabilities; and that can even be moved from inside a moving vehicle out into the slipstream without transmitting any wind buffeting to the stabilizing mass of the master sled sequestered inside the vehicle;

control of two cameras simultaneously: one on the master sled and an optionally smaller one on the slave sled at the far end of the extended balance pole, such that angular direction of the latter is "slaved" to that of the former and the operator can supply, for example, simultaneous wide and close-up shots of a scene;

modular configuration for addition of lightweight pole segments, or 'super-post' telescoping segments, or dynamically extending and retracting segments such that the camera can be hyper-extended as much as 20 or more feet from the ambulatory operator, yet remain stable, intuitively controlled and automatically 'back-panned' and 'back-tilted' for consistent aiming, as the extra-long balance pole is elevated and traversed; and remote control of a slave camera extended on a balance pole without the necessity of locally counterweighing the mass of the camera at the slave end, thus facilitating the use of heavier cameras.

While this invention has been described with respect to the preferred and simplified embodiments above, it is to be understood that various alterations and modifications can be made to components of the stable, extendable, angularly agile camera support within the scope of this invention. For example, although the invention is particularly applicable to use with cameras, the invention can be used to support, aim, position and/or stabilize other types of equipment or tools.

Claimed is:

1. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes; and
a mechanism to replicate the motion of the primary gimbal at the secondary gimbal.

2. The support system of claim 1 further comprising:
one or more primary component masses connected to and balanced around the balance pole primary end with the primary gimbal apparatus; and
one or more secondary component masses connected to and balanced around the balance pole secondary end with the secondary gimbal apparatus.

3. The support system of claim 2 wherein the motion replicating mechanism comprises one or more rigid connections causing the primary component masses to be fixed with respect to the secondary component masses with respect to rotation about one or more axes of rotation.

4. The support system of claim 3 wherein the primary component masses are fixed with respect to the secondary component masses with respect to rotation about the pitch axis.

5. The support system of claim 3 wherein the primary component masses are fixed with respect to the secondary component masses with respect to rotation about the yaw axis.

6. The support system of claim 3 wherein the primary component masses are fixed with respect to the secondary component masses via one or more tie-rods.

7. The support system of claim 2 wherein the secondary component masses include a camera.

8. The support system of claim 2 wherein the primary component masses and the secondary component masses each includes a camera.

9. The support system of claim 2 wherein the primary component masses include a monitor and the secondary component masses include a camera.

10. The support system of claim 1 wherein the motion replicating mechanism comprises:
one or more sensors that detect the rotational motion about one or more axes of rotation of the primary gimbal; and
one or more motors functionally connected to the secondary gimbal to impart rotational motion about one or more axes of rotation of the secondary gimbal;
wherein the one or more motors impart the rotational motion based upon signals received from the one or more sensors, thereby replicating the motion about the axes of rotation of the primary gimbal about the axes of rotation of the secondary gimbal.

11. The support system of claim 10 wherein at least one of the sensors and at least one of the motors form a closed loop.

12. The support system of claim 11 wherein at least one of the motors is a servo motor.

13. The support system of claim 1 wherein the balance pole is telescopic.

14. The support system of claim 1 further comprising:
one or more shrouds and one or more stays to reduce bowing of the balance pole.

15. The support system of claim 1 wherein the mechanism to replicate the motion of the primary gimbal at the secondary gimbal comprises:
cables disposed within the balance pole.

16. A support system comprising:
an articulated arm attached to a support system as in claim 1.

17. A method of balancing and utilizing equipment comprising:
providing a support system as in claim 1;
balancing the primary component masses with respect to one another at the primary end;
balancing the secondary component masses with respect to one another at the secondary end;
balancing the balance pole about its longitudinal axis;
balancing the primary masses with respect to the secondary masses about the balance pole; and
moving the primary gimbal apparatus, thereby replicating the movement in the secondary gimbal apparatus while maintaining the approximate balance of the component masses.

18. The support system of claim 1 further comprising:
a handle assembly having:
a gimbal configured to be functionally connected to, and longitudinally slidably disposed on, the balance pole;
the gimbal having an outer race;
the gimbal outer race attached to a handle support bracket toward a proximate end of the handle support bracket;
the handle support bracket further attached to a handle shaft at a distal end of the handle support bracket, the handle shaft extending in a direction substantially perpendicular to a center line of the balance pole when the handle assembly is functionally connected to the balance pole; and
a grip disposed about the handle shaft and rotatable about a longitudinal axis of the handle.

19. A method of balancing and utilizing equipment comprising:
providing a support system as in claim 1;
moving the primary gimbal, thereby replicating the movement in the secondary gimbal while maintaining approximate balance of the system.

20. A gimbal and handle apparatus for use with a support system having a balance pole comprising:
a handle assembly having:
a gimbal configured to be functionally connected to, and longitudinally slidably disposed on, the balance pole;
the gimbal having an outer race;
the gimbal outer race non-rotatably attached to a handle support bracket toward a proximate end of the handle support bracket;
the handle support bracket further attached to a handle grip, the handle grip extending in a direction substantially perpendicular to a center line of the balance pole when the handle assembly is functionally connected to the balance pole;
an arm mount bracket having distal and proximate ends, the arm mount bracket rotatably attached at its proximate end to the handle support bracket toward a proximate end of the handle support bracket;
an arm mount rotationally attached to the arm mount bracket distal end; and
a resilient component functionally arranged with respect to the arm mount bracket and the handle support bracket to limit rotation of the brackets with respect to one another and to dampen associated motion.

21. The support system of claim 20 wherein the handle assembly is configured to be attached to the gimbal outer race for either right-handed or left-handed use.

22. A method for modifying a camera support and stabilization system comprising:
providing a camera support and stabilization system;
adding a gimbal and handle apparatus according to claim 20.

23. An extension pole for a camera support system comprising:
a gimbal and handle apparatus according to claim 20.

24. A camera support system having an extension pole according to claim 23.

25. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes; and
a mechanism to replicate the motion of the primary gimbal at the secondary gimbal;
wherein the primary and secondary gimbal apparatuses provide three degrees of angular freedom.

26. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal;
one or more primary component masses connected to and balanced around the balance pole primary end with the primary gimbal apparatus; and
one or more secondary component masses connected to and balanced around the balance pole secondary end with the secondary gimbal apparatus;
wherein the motion replicating mechanism comprises one or more rigid connections causing the primary component masses to be fixed with respect to the secondary component masses with respect to rotation about one or more axes of rotation; and
wherein the primary component masses are angularly synchronized with respect to the secondary component masses via one or more pulleys and belts.

27. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal;
one or more primary component masses connected to and balanced around the balance pole primary end with the primary gimbal apparatus; and
one or more secondary component masses connected to and balanced around the balance pole secondary end with the secondary gimbal apparatus;
a handgrip connected to, but freely rotatable about, the balance pole;
wherein the motion replicating mechanism comprises one or more rigid connections causing the primary component masses to be fixed with respect to the secondary component masses with respect to rotation about one or more axes of rotation; and
wherein the primary and secondary gimbals provide only two degrees of angular freedom each, the degrees of angular freedom being the same degrees of angular freedom for each gimbal.

28. The support system of claim 27 comprising at least one annular bearing positioned to allow the handgrip to be freely rotatable about the balance pole.

29. The support system of claim 28 further comprising an offset handgrip component adjustably connected to the handgrip.

30. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal; and
a balance clamp disposed around the balance pole and having a weight with an adjustable location on the clamp to balance the balance pole about its longitudinal axis.

31. The support system of claim 30 wherein the balance clamp comprises:
a weight threadedly attached to a rod, the rod positioned so the weight can be dialed inward or outward on threaded rod until the balance pole is balanced about its longitudinal axis.

32. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal; and
wherein the mechanism to replicate the motion of the primary gimbal at the secondary gimbal comprises:
a primary tie strut pivotally attached to the primary center post and having a first universal joint at a first end and a second universal joint at a second end;
a secondary tie strut pivotally attached to the secondary center post and having a first universal joint at a first end and a second universal joint at a second end;
a first tie rod longitudinally disposed between the primary strut first universal joint and the secondary strut first universal joint; and
a second tie rod substantially parallel to the first tie rod and longitudinally disposed between the primary strut second universal joint and the secondary strut second universal joint.

33. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal; and wherein the mechanism to replicate the motion of the primary gimbal at the secondary gimbal comprises:
a tie rod extending from a primary race tube to a secondary race tube, the primary race tube disposed about a primary center post, the primary center post disposed through the primary gimbal, the secondary race tube disposed about a secondary center post, the secondary center post disposed through the secondary gimbal,
the tie rod having a primary end and a secondary end with a gimbal at each end;
the primary race tube having a primary toothed gear attached thereto and the secondary race tube have a secondary toothed gear attached thereto; and
a belt functionally compatible with and connected to the toothed gears.

34. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal; and
wherein the mechanism to replicate the motion of the primary gimbal at the secondary gimbal comprises:
cables disposed within the balance pole; and
a belt and gear system in functional relationship to the cables.

35. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal.
one or more primary component masses connected to and balanced around the balance pole primary end with the primary gimbal apparatus;
one or more secondary component masses connected to and balanced around the balance pole secondary end with the secondary gimbal apparatus;
wherein the motion replicating mechanism comprises one or more rigid connections causing the primary component masses to be fixed with respect to the secondary component masses with respect to rotation about one or more axes of rotation;
wherein the primary component masses are fixed with respect to the secondary component masses via one or more tie-rods;
a primary pulley tree attached to an outer race housing of the primary gimbal;
a secondary pulley tree attached to an outer race housing of the secondary gimbal;
a primary center post disposed within an inner race of the primary gimbal;
a secondary center post disposed within an inner race of the secondary gimbal;
wherein the one or more tie rods are dispose substantially parallel to the balance pole and to one another and extend from the primary pulley tree to the secondary pulley tree, each tie rod attached pivotally at each pulley tree, such that the balance pole, tie rods and center posts form a parallelogram, which provides a second degree of angular connection between the primary and secondary center posts; and
wherein each pulley tree has a plurality of pulleys functionally connected with an endless line such that motion of the primary gimbal is replicated at the secondary gimbal to provide a third degree of angular connection.

36. The support system of claim 35 wherein each pulley tree includes:
two pivot pulleys; and
two turning pulleys; and
wherein the endless line is disposed at least partially around a primary main pan pulley and a secondary main pan pulley, respectively connected to the primary and secondary gimbal inner races, and further disposed at least partially around each turning pulley and each pivot pulley, and further along the length of and in the direction of each tie rod.

37. The support system of claim 35 further comprising:
at least one vibration control system to dampen vibration imparted to a center post.

38. The support system of claim 37 wherein the vibration control system comprises:
a mounting bracket rigidly attached to a pulley tree and at least partially encircling a center post; and
the mounting bracket having a plurality of idler rollers, the mounting bracket adjustably positioned to allow the idler rollers to contact the center post.

39. The support system of claim 38 wherein at least one idler roller is adjustable in a single radial direction with respect to the center post.

40. The support system of claim 35 wherein at least one of the pulley trees further includes a vibration control system, the pulley tree comprising:
an idler body hingedly attached to an idler body gate and disposed partially around the associated primary or secondary center post;
the idler body gate and idler body having at least one idler roller each, the idler tree gate and idler body combination adjustably positioned to allow the idler rollers to contact the associated center post;
one or more idler body standoff supports attached to either the idler body or idler body gate to space the idler body and idler body gate a distance from the gimbal;
the standoff supports further attached to a base;
the base attached rigidly to the gimbal outer race housing;
the pulleys rigidly attached to the idler body and the base; and
an adjustment device to adjustably position the idler gate, idler body or both, so the idler rollers contact the associated center post.

41. The support system of claim 40 wherein:
two pivot pulleys are disposed on the idler body; and
two turning pulleys are disposed on the idler gate.

42. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal; and
a handle assembly comprising:
a balance pole gimbal in functional connection to, and longitudinally slidably disposed on, the balance pole;
the balance pole gimbal having an outer race;
the balance pole gimbal outer race attached to a handle support bracket at a proximate end of the handle support bracket;
the handle support bracket having a notch to accommodate the tie rods as the support system is rotated;
the handle support bracket further attached to a handle shaft at a distal end of handle support bracket, the handle shaft extending in a direction substantially perpendicular to a center line of the balance pole;
a grip disposed about the handle shaft and rotatable about a longitudinal axis of the handle; and
an arm mounting assembly attached to a distal end of the handle shaft to mount a support arm, the arm mounting assembly rotatable with respect to the support arm about a substantially vertical axis, which is substantially perpendicular to the longitudinal axis of the handle shaft.

43. The support system of claim 42 further comprising:
one or more handle support bracket connection components disposed on the balance pole gimbal outer race;
one or more components complimentary to the handle support bracket connection components disposed on the handle support bracket; and
resilient components disposed between the balance pole gimbal outer race handle support bracket connection components and the complimentary connection components so that motion of the handle support bracket substantially perpendicular to the longitudinal axis of the handle shaft will be dampened by the resilient components.

44. The support system of claim 43 wherein:
the one or more handle support bracket connection components are extensions that protrude from the balance pole gimbal outer race substantially perpendicularly to the balance pole;
the complimentary components are substantially u-shaped such that the one or more extensions are disposed within the u-shaped complimentary components; and
the resilient components are disposed on either side of the one or more extensions between the extensions and the complimentary components.

45. A gimbal and handle apparatus for use with a support system having a balance pole comprising:
a handle assembly having:
a gimbal configured to be functionally connected to, and longitudinally slidably disposed on, the balance pole;
the gimbal having an outer race;
the gimbal outer race non-rotatably attached to a handle support bracket toward a proximate end of the handle support bracket;
the handle support bracket further attached to a handle grip, the handle grip extending in a direction substantially perpendicular to a center line of the balance pole when the handle assembly is functionally connected to the balance pole;
an arm mount bracket having distal and proximate ends, the arm mount bracket rotatably attached at its proximate end to the handle support bracket toward a proximate end of the handle support bracket;
an arm mount rotationally attached to the arm mount bracket distal end;
a resilient component functionally arranged with respect to the arm mount bracket and the handle support bracket to limit rotation of the brackets with respect to one another and to dampen associated motion; and
an arm mounting assembly attached to a distal end of the arm mount bracket to mount a support arm, the arm mounting assembly rotatable with respect to the support arm about a substantially vertical axis, which is substantially perpendicular to the longitudinal axis of the handle grip.

46. A gimbal and handle apparatus for use with a support system having a balance pole comprising:
a handle assembly having:
a gimbal configured to be functionally connected to, and longitudinally slidably disposed on, the balance pole;
the gimbal having an outer race;
the gimbal outer race non-rotatably attached to a handle support bracket toward a proximate end of the handle support bracket;
the handle support bracket further attached to a handle grip, the handle grip extending in a direction substantially perpendicular to a center line of the balance pole when the handle assembly is functionally connected to the balance pole;
an arm mount bracket having distal and proximate ends, the arm mount bracket rotatably attached at its proximate end to the handle support bracket toward a proximate end of the handle support bracket;
an arm mount rotationally attached to the arm mount bracket distal end;
a resilient component functionally arranged with respect to the arm mount bracket and the handle support bracket to limit rotation of the brackets with respect to one another and to dampen associated motion; and
a notch in the handle support bracket to accommodate one or more tie rods of a support system when the support apparatus is rotated.

47. A support system comprising:
a balance pole with a primary end and a secondary end;
a primary gimbal apparatus having a primary yoke non-rotatably connected to the primary end of the balance pole;
a secondary gimbal apparatus having a secondary yoke non-rotatably connected to the secondary end of the balance pole;
a tertiary gimbal attached to the balance pole at its center of balance so that the balance pole can rotate within it to provide a first degree of angular connection between the primary and secondary yokes;
a mechanism to replicate the motion of the primary gimbal at the secondary gimbal; and
a handle assembly comprising:
a gimbal configured to be functionally connected to, and longitudinally slidably disposed on, the balance pole;
the gimbal having an outer race;

the gimbal outer race attached to a handle support bracket toward a proximate end of the handle support bracket;

the handle support bracket further attached to a handle grip, the handle grip extending in a direction substantially perpendicular to a center line of the balance pole when the handle assembly is functionally connected to the balance pole;

an arm mount bracket having distal and proximate ends, the arm mount bracket rotatably attached at its proximate end to the handle support bracket toward a proximate end of the handle support bracket;

an arm mount rotationally attached to the arm mount bracket distal end; and a resilient component functionally arranged with respect to the arm mount bracket and the handle support bracket to limit rotation of the brackets with respect to one another and to dampen associated motion.

48. The gimbal and handle apparatus of claim 47 further comprising:

an arm mounting assembly attached to a distal end of the arm mount bracket to mount a support arm, the arm mounting assembly rotatable with respect to the support arm about a substantially vertical axis, which is substantially perpendicular to the longitudinal axis of the handle grip.

49. The gimbal and handle apparatus of claim 47 further comprising:

a notch in the handle support bracket to accommodate one or more tie rods of a support system when the support apparatus is rotated.

* * * * *